(12) United States Patent
Ishikawa et al.

(10) Patent No.: US 8,442,157 B2
(45) Date of Patent: May 14, 2013

(54) WIRELESS APPARATUS AND SIGNAL PROCESSING METHOD

(75) Inventors: Hiroyoshi Ishikawa, Kawasaki (JP);
Kazuo Nagatani, Kawasaki (JP);
Hajime Hamada, Kawasaki (JP);
Nobukazu Fudaba, Kawasaki (JP);
Yuichi Utsunomiya, Kawasaki (JP);
Takeshi Ohba, Kawasaki (JP);
Hideharu Shako, Kawasaki (JP);
Yasuhito Funyu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 332 days.

(21) Appl. No.: 12/794,124

(22) Filed: Jun. 4, 2010

(65) Prior Publication Data
US 2011/0038400 A1    Feb. 17, 2011

(30) Foreign Application Priority Data

Aug. 12, 2009    (JP) .................................. 2009-187237

(51) Int. Cl.
*H04B 1/38* (2006.01)
(52) U.S. Cl.
USPC ........................... 375/322; 375/221; 375/219
(58) Field of Classification Search .................... 375/322
See application file for complete search history.

(56) References Cited

U.S. PATENT DOCUMENTS

| | | | | |
|---|---|---|---|---|
| 5,870,668 A | * | 2/1999 | Takano et al. | 455/126 |
| 6,115,432 A | * | 9/2000 | Mishima et al. | 375/326 |
| 6,313,703 B1 | * | 11/2001 | Wright et al. | 330/149 |
| 7,388,926 B2 | * | 6/2008 | Ishikawa et al. | 375/285 |
| 7,514,996 B2 | * | 4/2009 | Furuta et al. | 330/149 |
| 7,986,923 B1 | * | 7/2011 | Opris | 455/103 |
| 2001/0005402 A1 | | 6/2001 | Nagatani et al. | |
| 2002/0181611 A1 | * | 12/2002 | Kim | 375/296 |
| 2003/0007574 A1 | * | 1/2003 | Li et al. | 375/316 |
| 2004/0212428 A1 | | 10/2004 | Ode et al. | |
| 2005/0047521 A1 | * | 3/2005 | Ishikawa et al. | 375/296 |
| 2005/0069050 A1 | * | 3/2005 | Ding et al. | 375/296 |
| 2005/0073361 A1 | * | 4/2005 | Hamada et al. | 330/149 |
| 2005/0181749 A1 | * | 8/2005 | Lee | 455/126 |

(Continued)

FOREIGN PATENT DOCUMENTS

| | | |
|---|---|---|
| CN | 1164043 | 8/2004 |
| CN | 1691660 | 11/2005 |

(Continued)

OTHER PUBLICATIONS

Korean Notice of Preliminary Rejection dated Oct. 27, 2011, from corresponding Korean Application No. 10-2010-61179.

(Continued)

*Primary Examiner* — Sam K Ahn
*Assistant Examiner* — Santiago Garcia
(74) *Attorney, Agent, or Firm* — Katten Muchin Rosenman LLP

(57) ABSTRACT

A wireless apparatus includes: an A/D converter which samples an in-phase signal component and a quadrature signal component from a quadrature-modulated signal of analog form alternately; a digital quadrature demodulation unit which applies digital quadrature demodulation to an output signal of the A/D converter and outputs an in-phase signal and a quadrature signal; and an error detection unit which, based on the in-phase and quadrature signals output from the digital quadrature demodulation unit, detects a time difference error between the sample timing of the in-phase signal component and the sample timing of the quadrature signal component.

11 Claims, 18 Drawing Sheets

U.S. PATENT DOCUMENTS

| | | | |
|---|---|---|---|
| 2005/0238114 A1* | 10/2005 | Ishikawa et al. | 375/298 |
| 2006/0009180 A1* | 1/2006 | Xu et al. | 455/226.1 |
| 2007/0142009 A1* | 6/2007 | Scarpa et al. | 455/132 |
| 2008/0130798 A1* | 6/2008 | Ohba et al. | 375/343 |
| 2008/0197925 A1* | 8/2008 | Furuta et al. | 330/149 |
| 2009/0092193 A1* | 4/2009 | Fujita | 375/260 |
| 2009/0190705 A1* | 7/2009 | Bai et al. | 375/371 |
| 2009/0322425 A1* | 12/2009 | Shako et al. | 330/149 |
| 2010/0239047 A1* | 9/2010 | Takayashiki | 375/296 |

FOREIGN PATENT DOCUMENTS

| | | |
|---|---|---|
| JP | 06-086006 | 3/1994 |
| JP | 2001-103104 | 4/2001 |
| JP | 2001-189685 | 7/2001 |
| JP | 2005-311710 | 11/2005 |
| JP | 4098745 | 6/2008 |
| JP | 2008-172838 | 7/2008 |
| WO | 02087097 | 10/2002 |
| WO | 03103163 | 12/2003 |

OTHER PUBLICATIONS

Notice of Reasons for Rejection dated Jun. 21, 2011, from corresponding Japanese Application No. 2009-187237.

Chinese First Office Action dated Aug. 20, 2012, from corresponding Chinese Application No. 201010220162.8.

Notice of Reasons for Rejection dated Apr. 17, 2012, from corresponding Japanese Application No. 2009-187237.

* cited by examiner

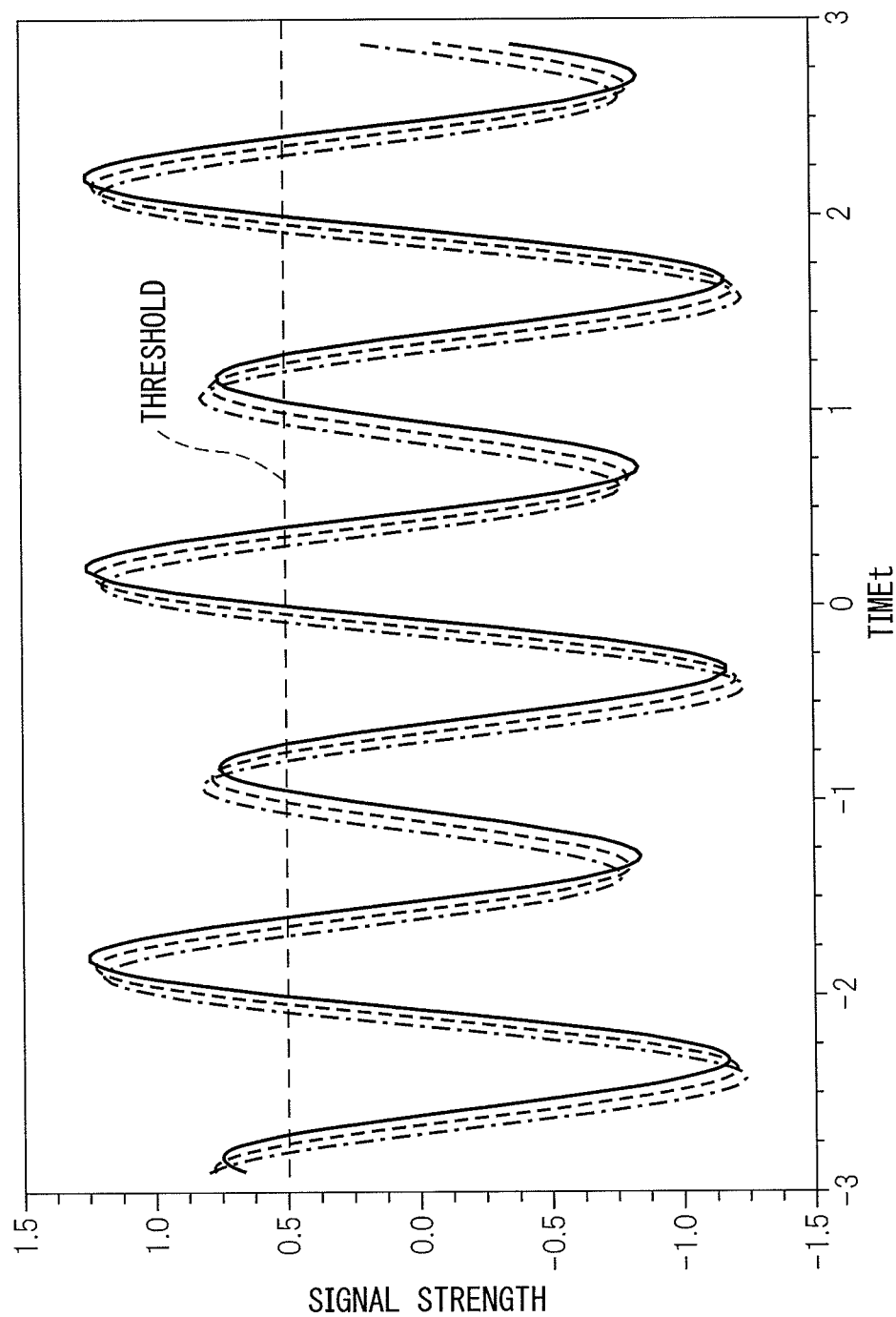

WIRELESS APPARATUS AND SIGNAL PROCESSING METHOD

CROSS-REFERENCE TO RELATED APPLICATIONS

This application is based upon and claims the benefit of priority of prior Japanese Patent Application No.2009-187237, filed on Aug. 12, 2009, the entire contents of which are incorporated herein by reference.

FIELD

This application is concerned with a wireless apparatus which converts a quadrature-modulated signal of analog form into a digital signal and which recovers an in-phase signal and a quadrature signal by applying digital quadrature demodulation to the digital signal.

BACKGROUND

It is known to provide a digital wireless apparatus which applies distortion compensation to a baseband modulated signal in a distortion compensator, converts the distortion-compensated signal into an analog signal by a D/A converter using a sampling clock of a first frequency, and amplifies the signal by a power amplifier PA for transmission, wherein a portion of the transmitted signal is fed back and demodulated, and the distortion component occurring in the PA is detected to calculate a distortion compensating coefficient for canceling out the distortion. In this digital wireless apparatus, the feedback signal is converted by a frequency converter into an intermediate frequency IF signal, the IF signal is under-sampled by an A/D converter using a sampling clock of a second frequency, the output signal of the A/D converter is demodulated through digital quadrature demodulation into a first quadrature-demodulated signal, and a second quadrature-demodulated signal for distortion component detection is extracted from the first quadrature-demodulated signal by using an LPF. In this digital wireless apparatus, a carrier wave to an analog quadrature modulator and an oscillator frequency signal to the frequency converter, as well as the sampling clocks of the first and second frequencies, are generated using a common reference oscillator source. The digital wireless apparatus is equipped with a digital FIR filter which removes a frequency component at one-half the second frequency from the first quadrature-demodulated signal.

It is also known to provide a distortion compensating apparatus which applies distortion compensation to an input signal by using a distortion compensating coefficient and supplies the distortion-compensated signal to a distortion device, and which computes a distortion compensating coefficient, based on the input signal before the distortion compensation and on a feedback signal fed back from the output side of the distortion device, and stores the thus computed distortion compensating coefficient by associating it with the input signal. This distortion compensating apparatus includes an A/D converter which converts the feedback signal into digital form, an FFT computation unit which computes a spectrum by applying a fast Fourier transform to the output of the A/D converter, a calculation unit which, based on the result of the FFT computation, calculates one of the values of signal-to-noise ratio SNR, adjacent channel leakage power ratio (ACLR), noise level Pn, and valid bit length ENBO, a delay timing determining unit which compares a calculated value at the current time with a calculated value obtained at the immediately preceding time and, based on the result of the comparison, adjusts signal delay time occurring through the distortion device and the feedback loop and determines the delay time by repeating the adjustment, and a delay circuit in which the delay time is set and which adjusts the timing for each of the units of the distortion compensating apparatus.

It is also known to provide an image sensor that includes a plurality of photoelectric conversion devices, a common signal line, a plurality of switching devices inserted between the common signal line and the respective photoelectric conversion devices, and a shift register for sequentially driving these devices. A noise absorbing capacitor, a switching device, and an inverter and capacitor for capacitively coupling a signal has opposite phase compared to a clock signal are connected in series to the common signal line of the image sensor. This serves to reduce the crosstalk noise signal of the clock signal superimposed on the common signal line.

It is also known to provide a distortion compensating apparatus that includes a predistortion unit which applies distortion compensation to an input signal by using a distortion compensating coefficient, a distortion compensating coefficient computing unit which computes a distortion compensating coefficient, based on the input signal before the distortion compensation and on a feedback signal fed back from the output side of the distortion device, and a distortion compensating coefficient storage unit which stores the thus computed distortion compensating coefficient by associating it with the input signal. This distortion compensating apparatus further includes a delay unit which adjusts the amount of delay of the feedback signal by using a digital filter.

It is also known to provide a distortion compensating apparatus that includes a distortion compensating coefficient computing unit which takes as input a difference signal between a transmit signal as a reference signal and a feedback signal, and computes a distortion compensating coefficient by an adaptive algorithm so as to reduce the difference signal, a distortion compensating coefficient storage unit whose stored contents are updated by the thus computed distortion compensating coefficient, and a distortion compensating unit which applies distortion compensation to the transmit signal by using the distortion compensating coefficient. This distortion compensating apparatus further includes a phase difference detection unit which detects a phase difference between the reference signal and the feedback signal, a phase correction unit which corrects the phase difference, and a control unit which generates a phase correction period and a distortion compensating coefficient update period alternately and which performs control so that the phase difference is corrected during the phase correction period and the distortion compensating coefficient is updated during the distortion compensating coefficient update period.

Related art is disclosed in Japanese Laid-open Patent Publication No. 2001-103104, International Publication Pamphlet No. WO2002/087097, Japanese Laid-open Patent Publication No. 06-86006, Japanese Laid-open Patent Publication No. 2001-189685, and International Publication Pamphlet No. WO2003/103163.

SUMMARY

A wireless apparatus according to an embodiment disclosed herein includes: an A/D converter which samples an in-phase signal component and a quadrature signal component from a quadrature-modulated signal of analog form alternately; a digital quadrature demodulation unit which applies digital quadrature demodulation to an output signal of the A/D converter and outputs an in-phase signal and a quadrature signal; and an error detection unit which, based on the in-phase and quadrature signals output from the digital quadrature demodulation unit, detects a time difference error between the sample timing of the in-phase signal component and the sample timing of the quadrature signal component.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWING(S)

FIG. 16 is an explanatory diagram (part 2) illustrating the clock signal on which crosstalk noise is superimposed;

DESCRIPTION OF EMBODIMENT(S)

Figure 1:
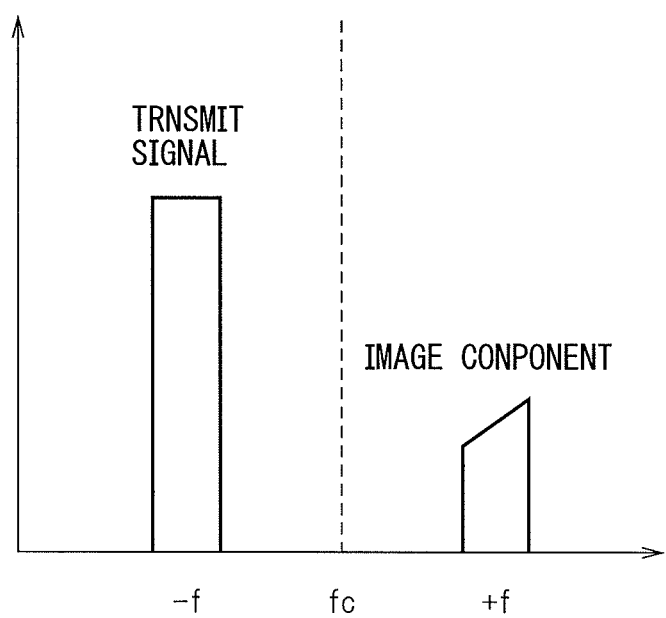
FIG. 1 is an explanatory diagram of an image component that occurs in in-phase and quadrature signals.

When a quadrature-modulated signal is demodulated using an analog quadrature demodulation circuit, a quadrature error may occur between the demodulated in-phase and quadrature signals or an error in the amount of delay between the in-phase and quadrature signals. This is because the analog quadrature demodulation circuit uses components that lack linearity. The quadrature error or the error in the amount of delay results in the generation of an image component in the in-phase and quadrature signals. FIG. 1 is an explanatory diagram of an image component that occurs in the in-phase and quadrature signals. The image component is an unwanted wave that occurs at a frequency (+f) located symmetrically to the frequency (−f) of the transmit signal with respect to the carrier frequency fc. Such an unwanted wave can lead to a degradation of the in-phase and quadrature signals.

According to the earlier described demodulation method that converts a quadrature-modulated signal into a digital signal and applies digital quadrature demodulation to the digital signal, since there is no need to use an analog quadrature demodulation circuit, it can be expected that a quadrature error or an error in the amount of delay may not easily occur in the in-phase and quadrature signals. However, even with this demodulation method, there have been cases where an image component occurs in the demodulated in-phase and quadrature signals, causing degradation of the in-phase and quadrature signals. The reason for this is as follows.

Suppose that the sampling frequency of the A/D converter (analog/digital converter) for sampling the quadrature-modulated signal is f and that a clock signal of frequency f is supplied to the A/D converter to provide the sample timing. There can occur cases where a clock signal of frequency f/2 is superimposed as crosstalk noise on the clock signal of frequency f. The clock signal source of frequency f/2 may be, for example, the clock signal supplied to the D/A converter (digital/analog converter) used in the quadrature modulation circuit. Alternatively, the clock signal source of frequency f/2 may be, for example, the clock signal supplied to digital circuitry that processes at least either one of the transmit and receive signals.

Figure 2A:
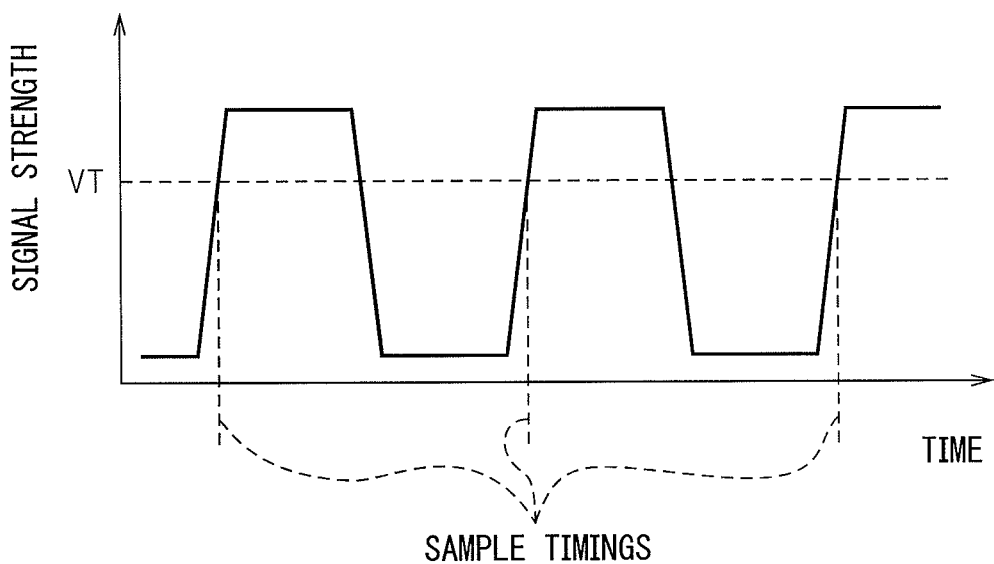
FIG. 2A is an explanatory diagram illustrating a clock signal waveform.

FIG. 2A is an explanatory diagram illustrating a clock signal waveform. The rising edge and falling edge of the clock signal each have a somewhat sloped shape. The A/D converter samples the input signal at the instant that the strength of the clock signal at the rising edge exceeds a given threshold value VT. Accordingly, if the amplitude of the clock signal changes, then the sample timing, i.e., the instant at which the strength of the clock signal exceeds the threshold value VT, also changes.

Figure 2B:
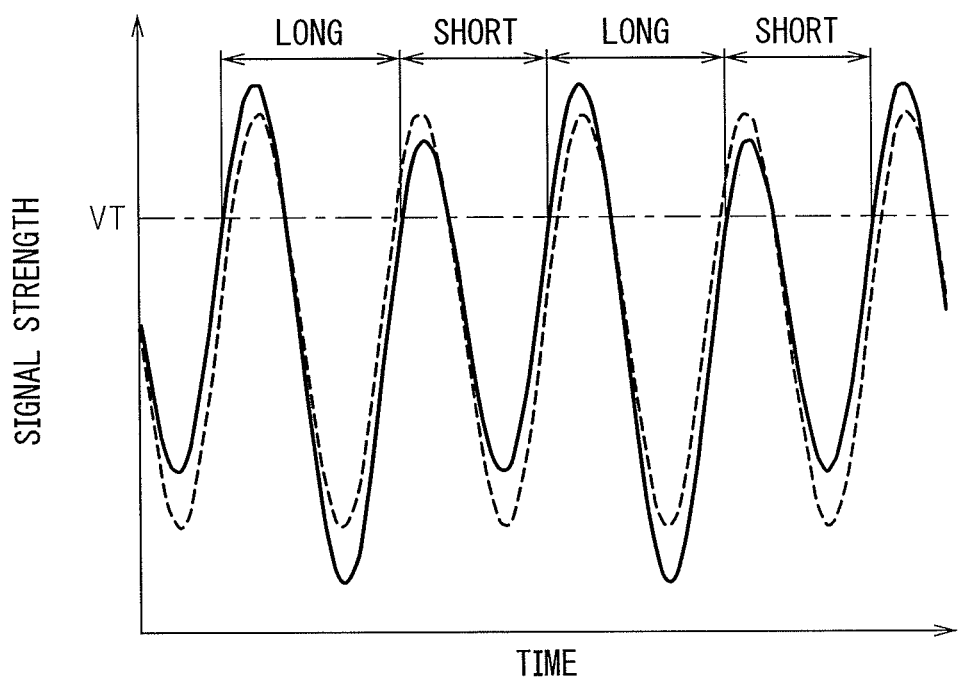
FIG. 2B is an explanatory diagram (part 1) illustrating a clock signal on which crosstalk noise is superimposed.

FIG. 2B is an explanatory diagram illustrating the clock signal on which crosstalk noise is superimposed. In FIG. 2B, the waveform of the clock signal is simulated by a sine wave to make it easier to see how the sample timing changes due to the variation of the amplitude. In the case of the waveform of FIG. 2A also, a similar phenomenon occurs if crosstalk noise is superimposed.

The dashed line in FIG. 2B indicates the original clock signal simulated by a sine wave. The solid line indicates the clock signal after crosstalk noise has been superimposed thereon. The superimposed crosstalk noise here is a clock signal, also simulated by a sine wave, that has a frequency (f/2) equal to one-half the frequency f of the original clock signal.

A large-amplitude period and a small-amplitude period alternately appear in the clock signal when the crosstalk noise is superimposed thereon. As a result, when the crosstalk noise is superimposed on the clock signal, if the input signal is sampled at the instant that the strength of the clock signal at the rising edge exceeds the threshold value VT, a long sampling interval and a short sampling interval appear alternately.

The A/D converter samples the in-phase signal component and the quadrature signal component from the quadrature-modulated signal alternately. That is, when sampling the quadrature-modulated signal at successive timings $t_1, t_2, t_3, t_4, \ldots t_{2n-1}, t_{2n}$, the A/D converter samples either the in-phase signal component or the quadrature signal component at timings $t_1, t_4, \ldots, t_{2n}$. and the other component at timings $t_2, t_4, \ldots, t_{2n}$.

Accordingly, if the long sampling interval and the short sampling interval appear alternately, either the in-phase signal component or the quadrature signal component is sampled with too early timing and/or the other component is sampled with too late timing. That is, an error proportional to the lengthening/shortening of the sampling interval occurs in the time difference between the sample timing of the in-phase signal component and the sample timing of the quadrature signal component.

In this way, if the clock signal of frequency f/2 is superimposed as crosstalk noise on the clock signal of frequency f, an error occurs in the time difference between the sample timing of the in-phase signal component and the sample timing of the quadrature signal component. This error can result in the generation of an image component in the in-phase and quadrature signals and cause degradation of the in-phase and quadrature signals.

Figure 3:
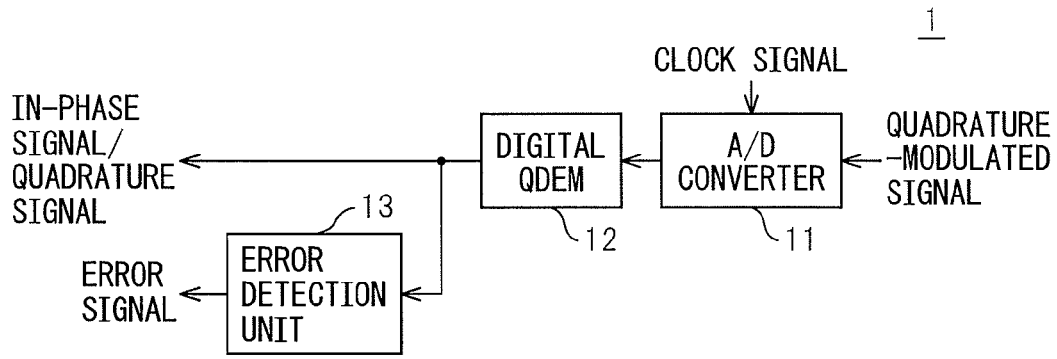
FIG. 3 is a simplified schematic diagram illustrating the configuration of a first example of a wireless apparatus according to an embodiment.

In view of this, the embodiment described hereinafter detects an error that can occur in the time difference between the sample timings. The embodiment will be described below with reference to the accompanying drawings. FIG. 3 is a simplified schematic diagram illustrating the configuration of a first example of a wireless apparatus according to the embodiment. Reference numeral 1 is the wireless apparatus, 11 is an A/D converter, 12 is a digital quadrature demodulation unit, and 13 is an error detection unit. In the figure, the digital quadrature demodulation unit is designated "DIGITAL QDEM." The same designation is used in the drawings illustrating other examples.

The wireless apparatus 1 thus includes the A/D converter 11, digital quadrature demodulation unit 12, and error detection unit 13. The A/D converter 11 samples an in-phase signal component and a quadrature signal component from a quadrature-modulated analog signal in synchronism with the clock timing provided by a supplied clock signal. The A/D converter 11 samples the in-phase signal component and the quadrature signal component alternately. That is, one of the signal components sampled by the A/D converter 11 at two successive sample timings is the in-phase signal component, and the other is the quadrature signal component.

The digital quadrature demodulation unit 12 applies digital quadrature demodulation to the in-phase signal component and quadrature signal component output from the A/D converter, and outputs the in-phase signal and the quadrature signal. Based on the in-phase and quadrature signals output from the digital quadrature demodulation unit 12, the error detection unit 13 detects an error that can occur in the time difference between the sample timing of the in-phase signal component and the sample timing of the quadrature signal component.

According to the present example, an error can be detected that may occur in the time difference between the sample timings of the in-phase signal component and the quadrature signal component. This makes it possible to detect the occurrence of an error that occurs in the in-phase and quadrature signals due to the time difference error. As a result, when compensating for an error occurring in the in-phase and quadrature signals, for example, the time difference error detected by the error detection unit 13 can be used as an index value.

Figure 4:
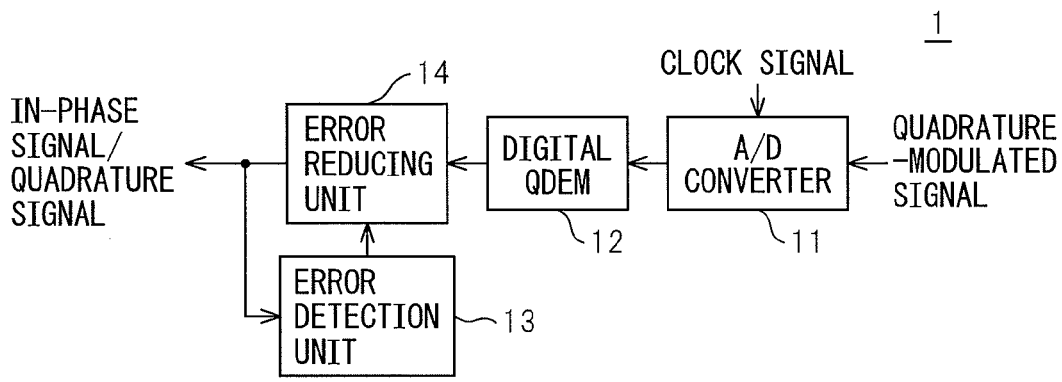
FIG. 4 is a simplified schematic diagram illustrating the configuration of a second example of the wireless apparatus according to the embodiment.

Next, a second example of the wireless apparatus according to the embodiment will be described. The wireless apparatus of the second example is designed to reduce the error occurring in the in-phase and quadrature signals due to the time difference error between the sample timings. FIG. 4 is a simplified schematic diagram illustrating the configuration of the second example of the wireless apparatus according to the embodiment. Reference numeral 14 indicates an error reducing unit. The wireless apparatus 1 here includes the error reducing unit 14 in addition to the component elements described with reference to FIG. 3. Based on the time difference error detected by the error detection unit 13, the error reducing unit 14 reduces the error occurring in the in-phase and quadrature signals due to the time difference error.

According to the present example, it is possible to reduce the error occurring in the time difference between the sample timings of the in-phase signal component and the quadrature signal component. This serves to enhance the quality of the in-phase and quadrature signals.

The error reducing unit 14 may be configured to reduce the error of the in-phase and quadrature signals, for example, by correcting the in-phase and quadrature signals output from the digital quadrature demodulation unit 12. For this purpose, the wireless apparatus 1 may includes, as the error reducing unit 14, at least one of a delay amount changing unit which changes the amount of delay of at least either one of the in-phase and quadrature signals and a quadrature error correcting unit which corrects the quadrature error between the in-phase and quadrature signals, as will be described later.

Figure 5:
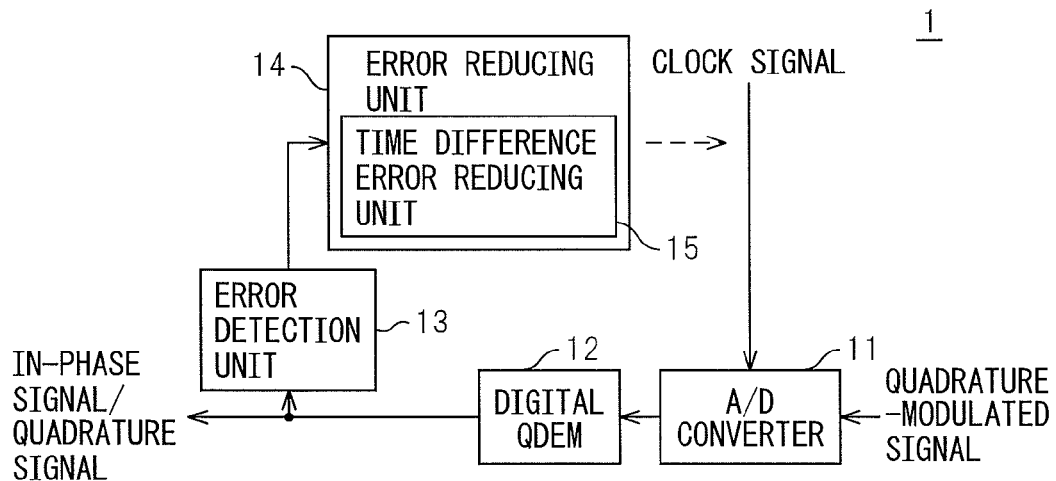
FIG. 5 is a simplified schematic diagram illustrating the configuration of a third example of the wireless apparatus according to the embodiment.

Alternatively, the error reducing unit 14 may be configured to reduce the error of the in-phase and quadrature signals by reducing the time difference error between the sample timing of the in-phase signal component and the sample timing of the quadrature signal component. FIG. 5 is a simplified schematic diagram illustrating the configuration of a third example of the wireless apparatus according to the embodiment. Reference numeral 15 indicates a time difference error reducing unit.

The error reducing unit 14 thus includes the time difference error reducing unit 15. The time difference error reducing unit 15 reduces the time difference error between the sample timing of the in-phase signal component and the sample timing of the quadrature signal component in the A/D converter 11. The quality of the in-phase and quadrature signals can be enhanced by reducing the time difference error between the sample timing of the in-phase signal component and the sample timing of the quadrature signal component, as in the present example.

The configurations of the first to third examples can be extensively applied to demodulators that demodulate quadrature-modulated signals. On the other hand, the configuration of any one of the first to third examples may be applied, for example, to a predistorter which, based on a feedback signal of a quadrature-modulated transmit signal, compensates for a nonlinear distortion occurring in the modulated transmit signal.

Figure 6:
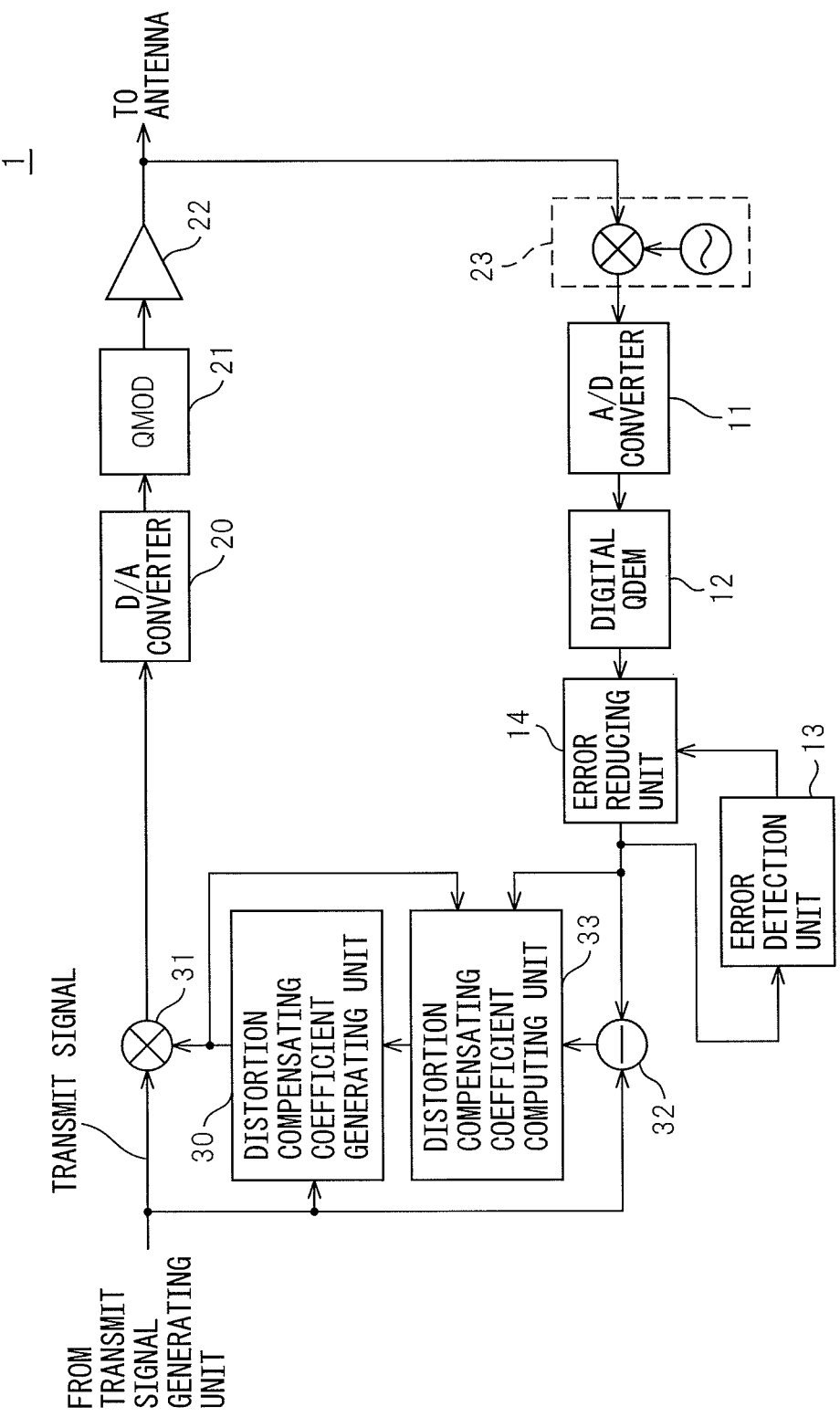
FIG. 6 is a simplified schematic diagram illustrating the configuration of a fourth example of the wireless apparatus according to the embodiment.

FIG. 6 is a simplified schematic diagram illustrating the configuration of a fourth example of the wireless apparatus according to the embodiment. The wireless apparatus 1 here includes a predistorter which takes as a feedback signal the in-phase and quadrature signals whose error has been reduced by the second configuration example of FIG. 4, and which compensates for a nonlinear distortion based on the feedback signal. Alternatively, the wireless apparatus 1 may use as the feedback signal the in-phase and quadrature signals whose error has been reduced by using the third configuration example of FIG. 5 instead of the second configuration example.

Reference numeral 20 is a D/A converter, 21 is a quadrature modulator, 22 is an amplifier, and 23 is a frequency converter. Further, reference numeral 30 is a distortion compensating coefficient generating unit, 31 is a multiplier, 32 is a subtractor, and 33 is a distortion compensating coefficient computing unit. In the figure, the quadrature modulator is designated "QMOD." The same designation is used in the drawings illustrating other examples. Further, the same component elements as those depicted in FIG. 4 are designated by the same reference numerals as those used in FIG. 4.

The wireless apparatus 1 thus includes the D/A converter 20, quadrature modulator 21, amplifier 22, and frequency converter 23 in addition to the component elements described with reference to FIG. 4. The D/A converter 20 converts the transmit signal of digital form into analog form. The quadrature modulator 21 generates a quadrature-modulated signal by quadrature-modulating the analog transmit signal. The amplifier 22 amplifies the quadrature-modulated signal. The quadrature-modulated signal amplified by the amplifier 22 is split into two parts, one of which is transmitted out from an antenna.

The other split part of the quadrature-modulated signal is fed to the frequency converter 23, which converts the quadrature-modulated signal to an intermediate frequency signal. The quadrature-modulated signal thus converted to the intermediate frequency signal is input to the A/D converter 11, which samples the in-phase signal component and quadrature signal component from the intermediate frequency signal.

The wireless apparatus 1 further includes the distortion compensating coefficient generating unit 30, multiplier 31, subtractor 32, and distortion compensating coefficient computing unit 33. The distortion compensating coefficient generating unit 30, multiplier 31, subtractor 32, and distortion compensating coefficient computing unit 33 together constitute the predistorter.

The distortion compensating coefficient generating unit 30 stores a plurality of distortion compensating coefficients for various power levels of the transmit signal. The distortion compensating coefficient generating unit 30 takes the transmit signal as input, and supplies the distortion compensating coefficient appropriate to the power of the transmit signal to the multiplier 31. The multiplier 31 compensates for the distortion by multiplying the transmit signal by the distortion compensating coefficient.

The subtractor 32 takes as a feedback signal the in-phase and quadrature signals whose error has been reduced by the error reducing unit 14, and takes the transmit signal as a reference signal. The subtractor 32 calculates a difference signal between the feedback signal and the transmit signal, and supplies the difference signal to the distortion compensating coefficient computing unit 33.

The distortion compensating coefficient computing unit 33 computes the distortion compensating coefficient by an adaptive algorithm so as to reduce the difference signal. The distortion compensating coefficient computing unit 33 updates the stored contents of the distortion compensating coefficient generating unit 30 by replacing the distortion compensating coefficient stored in the distortion compensating coefficient generating unit 30 by the computed distortion compensating coefficient. The process for updating the distortion compensating coefficient stored in the distortion compensating coefficient generating unit 30 will be described in detail later.

The distortion compensating coefficient generating unit 30 is given as one example of the distortion compensating coefficient storing unit described in the appended claims. The distortion compensating coefficient generating unit 30 and the multiplier 31 are given as one example of the distortion compensating unit described in the appended claims. Further, the subtractor 32 and the distortion compensating coefficient computing unit 33 are given as one example of the distortion compensating coefficient computing unit described in the appended claims.

According to the present example, since the quality of the in-phase and quadrature signals used as the feedback signal improves, the distortion compensating performance of the predistorter increases.

Figure 7:
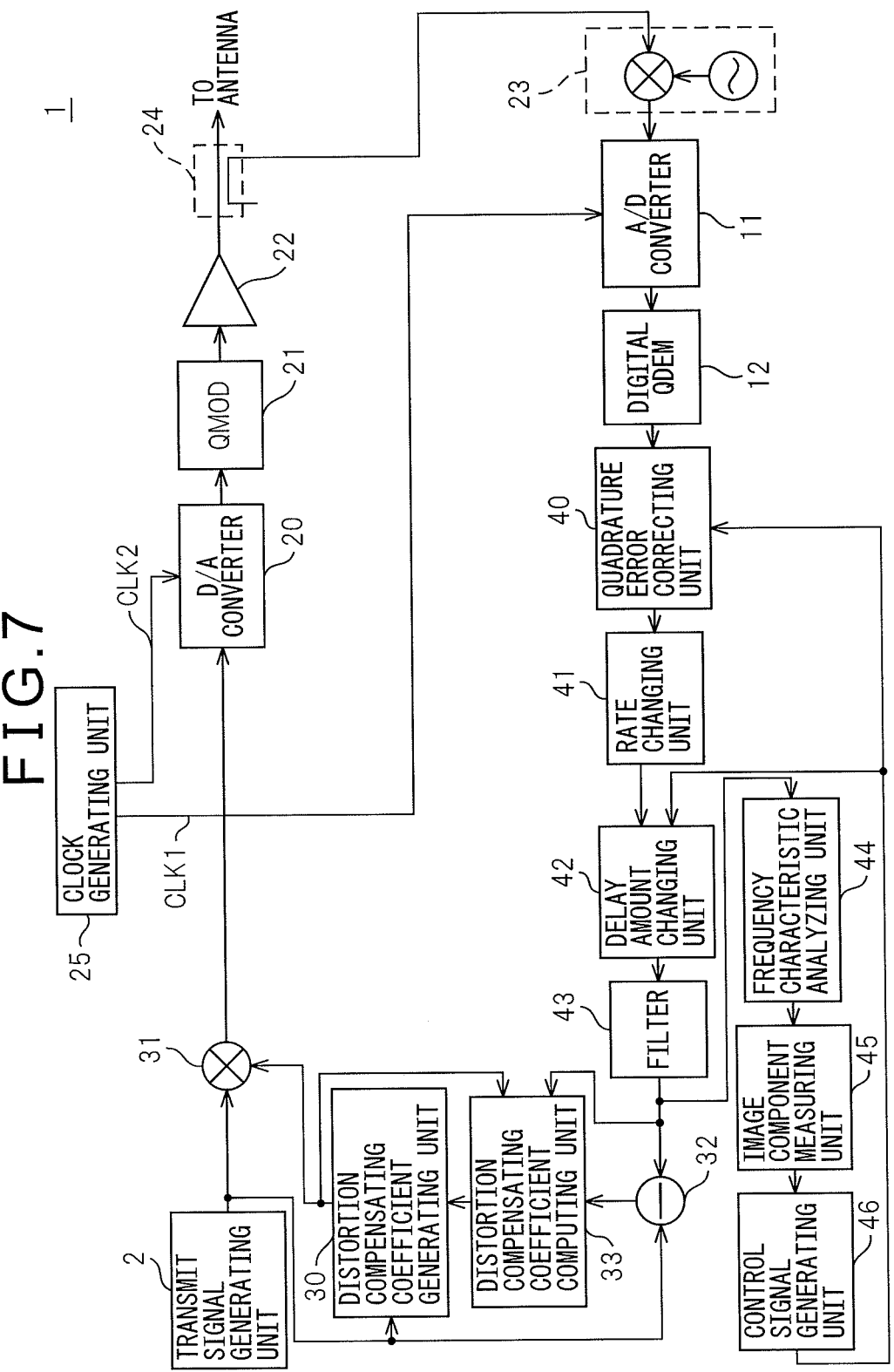
FIG. 7 is a simplified schematic diagram illustrating the configuration of a fifth example of the wireless apparatus according to the embodiment.

FIG. 7 is a simplified schematic diagram illustrating the configuration of a fifth example of the wireless apparatus according to the embodiment. Reference numeral 2 is a transmit signal generating unit, 24 is a directional coupler, and 25 is a clock signal generating unit. Further, reference numeral 40 is a quadrature error correcting unit, 41 is a rate changing unit, 42 is a delay amount changing unit, and 43 is a filter. Reference numeral 44 is a frequency characteristic analyzing unit, 45 is an image component measuring unit, and 46 is a control signal generating unit.

The schematic diagram of FIG. 7 explicitly indicates that the wireless apparatus 1 includes, in addition to the component elements described with reference to FIG. 6, the transmit signal generating unit 2 which generates a transmit signal, the directional coupler 24, and the clock signal generating unit 25. The directional coupler 24 splits the quadrature-modulated signal amplified by the amplifier 22, and directs one of the split parts of the quadrature-modulated signal to the antenna. The directional coupler 24 directs the other split part of the quadrature-modulated signal to the frequency converter 23.

The clock signal generating unit 25 supplies clock signals for providing sample timings to the A/D converter 11 and the D/A converter 20. The clock signal supplied to the A/D converter 11 is designated "CLK1", and the clock signal supplied to the D/A converter 20 is designated "CLK2". The sampling frequency of the A/D converter 11 may be set equal to twice the sampling frequency of the D/A converter 20, for example, in order to expand the frequency range over which the predistorter performs the distortion compensation. The frequency of the clock signal CLK1 supplied to the A/D converter 11 is designated "f". That is, the sampling frequency of the A/D converter 11 is f.

The wireless apparatus 1 further includes the quadrature error correcting unit 40, rate changing unit 41, delay amount changing unit 42, and filter 43. The quadrature error correcting unit 40 corrects the quadrature error between the in-phase and quadrature signals output from the digital quadrature demodulation unit 12, in accordance with a control signal supplied from the control signal generating unit 46. The rate changing unit 41 changes the sampling frequency of the in-phase and quadrature signals from "f" to "f/2" by decimating by a factor of 2 the samples taken from the in-phase and quadrature signals corrected by the quadrature error correcting unit 40.

The delay amount changing unit 42 changes the amount of delay of at least either one of the in-phase and quadrature signals in accordance with the control signal supplied from the control signal generating unit 46. The filter 43 phase-synchronizes the in-phase and quadrature signals by adjusting the amount of delay by "1/f" in relative fashion between the in-phase and quadrature signals. The operation of the quadrature error correcting unit 40, rate changing unit 41, delay amount changing unit 42, and filter 43 will be described later in more detail.

The wireless apparatus 1 further includes the frequency characteristic analyzing unit 44, image component measuring unit 45, and control signal generating unit 46. The frequency characteristic analyzing unit 44 analyses the frequency characteristics of least either one of the in-phase and quadrature signals output from the filter 43, and measures the frequency-by-frequency signal strength of least either one of the in-phase and quadrature signals. The frequency characteristic analyzing unit 44 may be configured to measure the frequency-by-frequency signal strength of least either one of the in-phase and quadrature signals by using, for example, FFT.

Based on the analysis results from the frequency characteristic analyzing unit 44, the image component measuring unit 45 measures the signal strength of the image component appearing in a known frequency range of least either one of the in-phase and quadrature signals. The control signal generating unit 46 reduces the signal strength of the image component by adjusting at least either the amount of change by which the amount of delay is to be changed by the delay amount changing unit 42 or the amount of correction to be applied by the quadrature error correcting unit 40, in such a manner that the signal strength of the image component measured by the image component measuring unit 45 falls within a predetermined allowable range.

As earlier described, the image component occurs in at least either one of the in-phase and quadrature signals due to the time difference error between the sample timings of the in-phase signal component and the quadrature signal component in the A/D converter 11. Thus, the frequency characteristic analyzing unit 44 and the image component measuring unit 45, for example, are given as one example of the error detection unit which detects the time difference error between the sample timings of the in-phase signal component and the quadrature signal component. On the other hand, the quadrature error correcting unit 40, the delay amount changing unit 42, and the control signal generating unit 46, for example, are given as one example of the error reducing unit 14 which reduces the time difference error.

Figure 8:
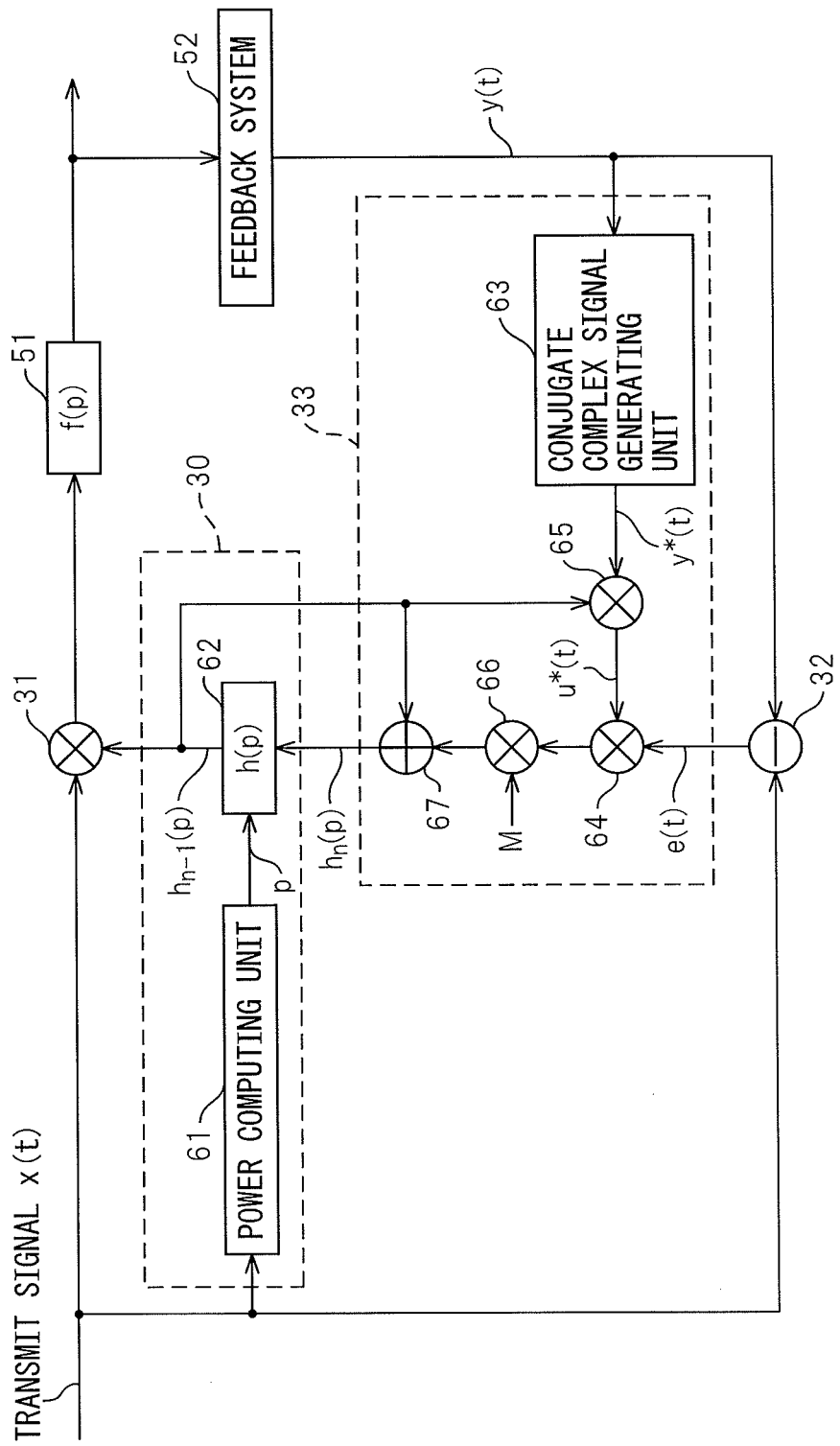
FIG. 8 is an explanatory diagram of a distortion compensation process by adaptive LMS.

Next, the distortion compensation process performed by the distortion compensating coefficient generating unit 30, multiplier 31, subtractor 32, and distortion compensating coefficient computing unit 33 will be described. FIG. 8 is an explanatory diagram of the distortion compensation process. The distortion compensating coefficient generating unit 30, multiplier 31, subtractor 32, and distortion compensating coefficient computing unit 33 perform the distortion compensation process by using, for example, an adaptive LMS algorithm.

The multiplier 31 multiplies the transmit signal x(t) by a distortion compensating coefficient $h_{n-1}(p)$. Reference numeral 51 is a transmit power amplifier having a distortion function f(p) that matches the power p of the transmit signal, and corresponds to the amplifier 22 in FIG. 7. Reference numeral 52 is a feedback system which receives the output signal of the transmit power amplifier 51 as a feedback signal and demodulates the feedback signal. The feedback signal demodulated by the feedback system 52 is designated y(t).

The distortion compensating coefficient generating unit 30 includes a power computing unit 61 and a distortion compensating coefficient storage unit 62. The power computing unit 61 computes the power p (=x(t)$^2$) of the transmit signal x(t). The distortion compensating coefficient storage unit 62 stores the distortion compensating coefficient that matches the power p of the transmit signal x(t). The distortion compensating coefficient storage unit 62 outputs the distortion compensating coefficient $h_{n-1}(p)$ that matches the power p of the transmit signal x(t). Further, the distortion compensating coefficient storage unit 62 updates the distortion compensating coefficient $h_{n-1}(p)$ by the distortion compensating coefficient $h_n(p)$ obtained by the LMS algorithm.

The distortion compensating coefficient computing unit 33 includes a conjugate complex signal generating unit 63, multipliers 64, 65, and 66, and an adder 67. The multiplier 64 multiplies u*(t) by the difference e(t) between the transmit signal x(t) and the modulated feedback signal y(t). The signal u*(t) is the product of the conjugate complex signal y*(t) of the modulated feedback signal y(t) and the distortion compensating coefficient $h_{n-1}(p)$.

The multiplier 65 outputs the signal u*(t) by multiplying y*(t) by the distortion compensating coefficient $h_{n-1}(p)$. The multiplier 66 multiplies the product of e(t) and u*(t) by a step size parameter μ. The adder 67 adds the distortion compensating coefficient $h_{n-1}(p)$ to μ×e(t)×u*(t).

With the above configuration, the following calculations are made.

$$h_n(p)=h_{n-1}(p)+\mu \times e(t) \times u^*(t)$$

$$e(t)=x(t)-y(t)$$

$$y(t)=h_{n-1}(p) \times x(t) \times f(p)$$

$$u^*(t)=x(t) \times f(p)=h_{n-1}(p) \times y^*(t)$$

$$p=|x(t)|^2$$

By performing the above calculations, the distortion compensating coefficient h(p) is updated so as to minimize the difference signal e(t) between the transmit signal x(t) and the modulated feedback signal y(t), and is made to finally converge to an optimum distortion compensating coefficient value, thus compensating for the distortion of the transmit power amplifier.

Figure 9:
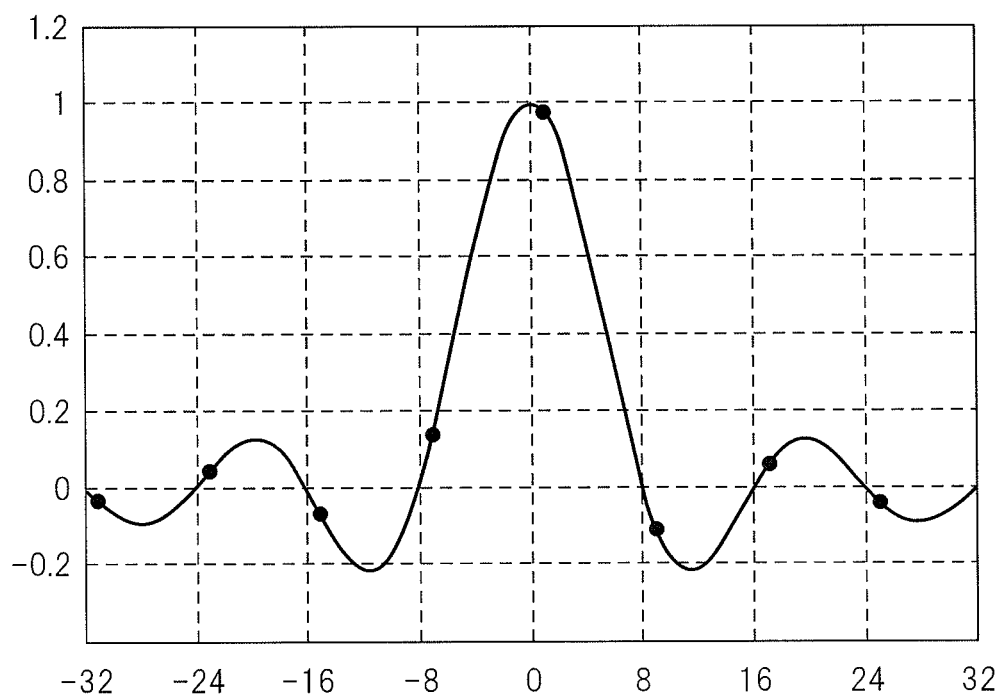
FIG. 9 is an explanatory diagram of tap coefficients when providing a delay of ⅛ symbol period.
Figure 10:
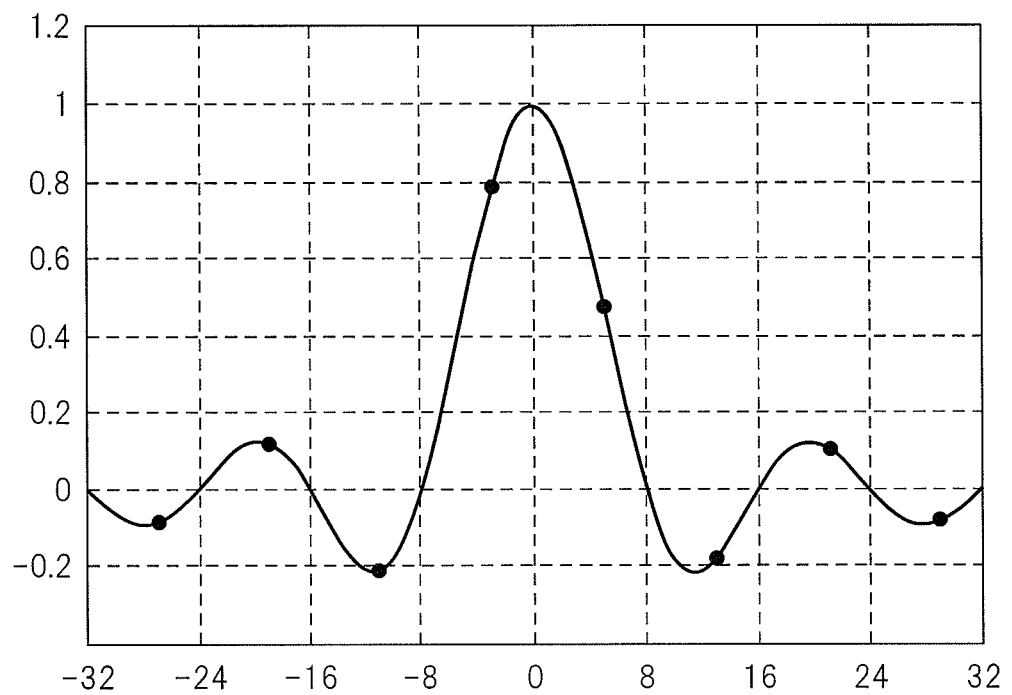
FIG. 10 is an explanatory diagram of tap coefficients when providing a delay of ⅝ symbol period.

Next, a description will be given of how the amount of delay of at least either one of the in-phase and quadrature signals is adjusted by the filter 43. The filter 43 which changes the amount of delay of at least either one of the in-phase and quadrature signals can be implemented using, for example, a finite impulse response filter (FIR filter). By appropriately setting the tap coefficients, the FIR filter can provide the output signal by delaying the input signal by a desired time. For example, if the values such as indicated at eight points in the FIR filter impulse response characteristic of FIG. 9 are adopted as the tap coefficients, the input signal can be delayed by ⅛ symbol period. On the other hand, if the values such as indicated at eight points in FIG. 10 are adopted as the tap coefficients, the input signal can be delayed by ⅝ symbol period. The filter 43 that achieves such processing need not necessarily be constructed from a FIR filter, but may be constructed from other digital filter such as an infinite impose response IIR filter.

Reference is made to FIG. 7. Due to crosstalk, the clock signal CLK2 supplied to the D/A converter 20 may be superimposed on the clock signal CLK1 supplied to the A/D converter 11. The frequency of the clock signal CLK2 is one half of the frequency f of CLK1. Accordingly, if the clock signal CLK2 is superimposed on the clock signal CLK1, a long sampling interval and a short sampling interval appear alternately in the sampling operation of the A/D converter 11, as previously depicted in FIG. 2B. That is, an error occurs in the time difference between the sample timing of the in-phase signal component and the sample timing of the quadrature signal component.

Crosstalk of the frequency component of f/2 into the clock signal CLK1 supplied to the A/D converter 11 may also arise from the clock signal supplied to other digital circuitry, for example, the transmit signal generating unit 2, in the wireless apparatus 1. That is, the source of the frequency component of f/2 superimposed on the clock signal CLK1 due to crosstalk is not always the clock signal CLK2.

More specifically, even if the frequency of the clock signal CLK2 is not equal to one-half the frequency of the clock signal CLK1, crosstalk of the frequency component f/2 into the clock signal CLK1 may occur due to the presence of some other clock signal than the clock signal CLK2. Further, even when no crosstalk whatsoever occurs from the clock signal CLK2 to the clock signal CLK1, crosstalk of the frequency component f/2 into the clock signal CLK1 may likewise occur due to the presence of some other clock signal than the clock signal CLK2.

Figure 11:
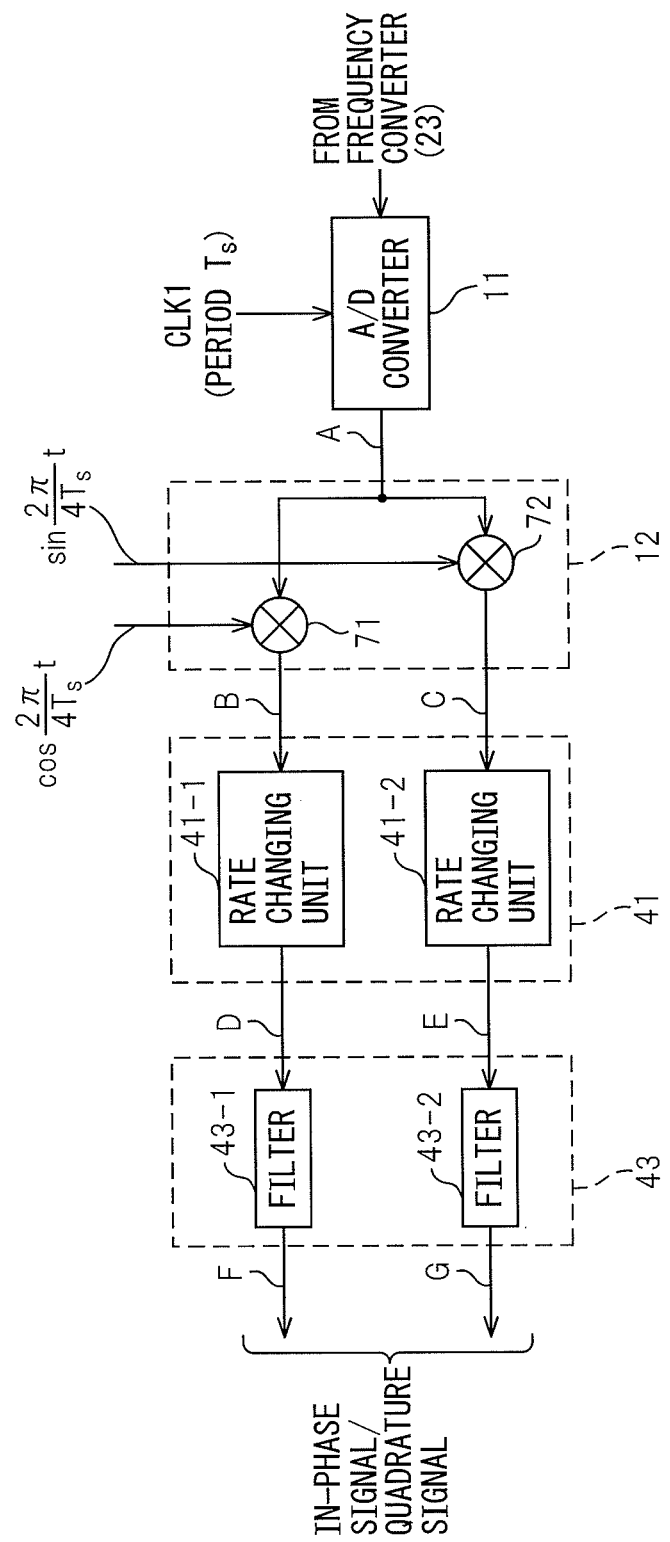
FIG. 11 is an explanatory diagram of an error that occurs in at least either one of the in-phase and quadrature signals due to a time difference error between the sample timing of an in-phase signal component and the sample timing of a quadrature signal component.

FIG. 11 is an explanatory diagram of the error that occurs in at least either one of the in-phase and quadrature signals due to the time difference error between the sample timings of the in-phase signal component and the quadrature signal component. The sampling period (1/f) of the A/D converter 11 is designated Ts. Reference numerals 71 and 72 are multipliers which multiply the output signal of the A/D converter 11 by $\cos(2\pi(\frac{1}{4}Ts)t)$ and $\sin(2\pi(\frac{1}{4}Ts)t)$, respectively, in the digital quadrature demodulation unit 12.

The rate changing unit 41 in FIG. 7 includes a rate changing unit 41-1 which decimates by a factor of 2 the in-phase signal demodulated by the digital quadrature demodulation unit 12 and a rate changing unit 41-2 which decimates by a factor of 2 the quadrature signal demodulated by the digital quadrature demodulation unit 12. In practice, the operation of the digital quadrature demodulation unit 12 and the rate changing unit 41 may be implemented by acquiring, from the sequence of samples output from the A/D converter 11, each even-numbered sample as one of the in-phase and quadrature signals and each odd-numbered sample as the other one of the in-phase and quadrature signals. The filter 43 in FIG. 7 includes a filter 43-1 which adjusts the amount of delay of the in-phase signal and a filter 43-2 which adjusts the amount of delay of the quadrature signal.

In FIG. 11, signals indicated at A to G are designated as signals A to G, respectively. The signal A is the signal output from the A/D converter 11 by sampling the quadrature-modulated signal with the sampling period Ts. Assuming that no frequency component of (f/2) is superimposed on the clock signal CLK1, the signal A can be expressed as follows.

$$\text{Signal } A = I(t)\cos(2\pi(\tfrac{1}{4}Ts)t) + Q(t)\sin(2\pi(\tfrac{1}{4}Ts)t) \quad (1)$$

The signal B is the product of the signal A and $\cos(2\pi(\frac{1}{4}Ts)t)$ that is output from the multiplier 71 in the digital quadrature demodulation unit 12. Suppose here that the in-phase signal component is sampled at sample timing $t=2n\times Ts$ and the quadrature signal component at sample timing $t=(2n+1)\times Ts$. Here, n is an integer. The signal B represents the sequence of in-phase signal samples I(0), 0, I(2Ts), 0, I(4Ts), and so on.

The signal C is the product of the signal A and $\sin(2\pi(\frac{1}{4}Ts)t)$ that is output from the multiplier 72 in the digital quadrature demodulation unit 12. The signal C represents the sequence of quadrature signal samples 0, Q(Ts), 0, Q(3Ts), and so on.

The signal D represents the sequence of in-phase signal samples, $I(2n\times Ts)$, output from the rate changing unit 41-1 by reducing the sampling frequency to (f/2), that is, by decimating the sequence of samples I(0), 0, I(2Ts), 0, I(4Ts), ... by removing the samples whose value is "0". The signal E represents the sequence of quadrature signal samples, $Q((2n+1)\times Ts)$, output from the rate changing unit 41-2 by reducing the sampling frequency to (f/2), that is, by decimating the sequence of samples 0, Q(Ts), 0, Q(3Ts), ... by removing the samples whose value is "0".

The signals F and G are respectively the in-phase signal and the quadrature signal phase-matched by means of the filters 43-1 and 43-2 by adjusting the amount of delay of the signals D and E by "1/f" in relative fashion between the in-phase and quadrature signals. For example, when the in-phase signal $I(2n\times Ts)$ is phase-matched to the quadrature signal $Q((2n+1)\times Ts)$ by means of the filter 43-1 by delaying the in-phase signal by "1/f", the signals F and G are expressed as $I((2n+1)\times Ts)$ and $Q((2n+1)\times Ts)$, respectively. On the other hand, when the quadrature signal $Q((2n+1)\times Ts)$ is phase-matched to the in-phase signal $I(2n\times Ts)$ by means of the filter 43-2 by advancing the quadrature signal by "1/f", the signals F and G are expressed as $I(2n\times Ts)$ and $Q(2n\times Ts)$, respectively.

Next, a description will be given of the case where the frequency component of (f/2) is superimposed on the clock signal CLK1, causing an error in the time difference between the sample timings of the in-phase signal component and the quadrature signal component in the A/D converter 11. Suppose here that the timing $t=(2n+1)\times Ts$, at which to sample the quadrature signal component, is displaced by an error $\Delta T$ due to the time difference error between the sample timings.

The sample (signal A) sampled by the A/D converter 11 at the sample timing $t=2n\times Ts$ is the same as that expressed by the earlier given equation (1). On the other hand, the sample (signal A) sampled at the sample timing $t=(2n+1)\times Ts$ is expressed by the following equation (2).

$$\text{Signal } A = I(t+\Delta T)\cos(2\pi(\tfrac{1}{4}Ts)\times(t+\Delta T)) + Q(t+\Delta T)\sin(2\pi(\tfrac{1}{4}Ts)\times(t+\Delta T)) \quad (2)$$

Next, the signal C is calculated which is the product of the signal A of equation (2) and $\sin(2\pi(\frac{1}{4}Ts)t)$. The multiplier 72 multiplies the signal A by "0" ($=\sin(n\times\pi)$) at time $t=2n\times Ts$, and multiplies the signal A by "±1" ($=\sin(n\pi\times n/2)$) at time $t=(2n+1)\times Ts$. This serves to simplify the configuration of the digital quadrature demodulation unit 12.

Therefore, in the multiplier 72, the sample (signal A) that was expected to be sampled at time $t=2n\times Ts$ but actually sampled at time $t=2n\times Ts+\Delta T$ is also multiplied by "0" ($=\sin(n\times\pi)$). Likewise, the sample (signal A) that was expected to be sampled at time $t=(2n+1)\times Ts$ but actually sampled at time $t=(2n+1)\times Ts+\Delta T$ is also multiplied by "±1" ($=\sin(n\pi\times n/2)$).

As a result, when the sample is input that was sampled at the sample timing $(n\times Ts+\Delta T)$ where n is an even number, the output signal C of the multiplier 72 is "0". On the other hand, when the sample is input that was sampled at the sample timing $(n\times Ts+\Delta T)$ where n is an odd number, the output signal C of the multiplier 72 can be expressed by the following equation (3).

$$\text{Signal } C = I(n\times Ts+\Delta T)\cos(2\pi(\tfrac{1}{4}Ts)\times(n\times Ts+\Delta T)) + Q(n\times Ts+\Delta T)\sin(2\pi(\tfrac{1}{4}Ts)\times(n\times Ts+\Delta T)) \quad (3)$$

The following equation (4) is obtained by transforming the above equation (3).

$$\text{Signal } C = -I(n \times Ts + \Delta T)\sin((\pi/2Ts) \times \Delta T) + Q(n \times Ts + \Delta T)\cos((\pi/2Ts) \times \Delta T) \quad (4)$$

The signal E of equation (5) is obtained by decimating the signal C of equation (4) by a factor of 2.

$$\text{Signal } E = -I((2n+1) \times Ts + \Delta T)\sin((\pi/2Ts) \times \Delta T) + Q((2n+1) \times Ts + \Delta T)\cos((\pi/2Ts) \times \Delta T) \quad (5)$$

In this way, due to the sample timing error $\Delta T$ of the quadrature signal component, a delay error occurs in the quadrature signal E, and the quadrature signal component which would normally be sampled as $Q((2n+1) \times Ts)$ is actually sampled as $Q((2n+1) \times Ts + \Delta T)$. The error $\Delta T$ also causes a quadrature error in the quadrature signal E due to the terms "$-I((2n+1) \times Ts + \Delta T)\sin((\pi/2Ts) \times \Delta T)$" and "$\cos((\pi/2Ts) \times \Delta T)$."

Figure 12:
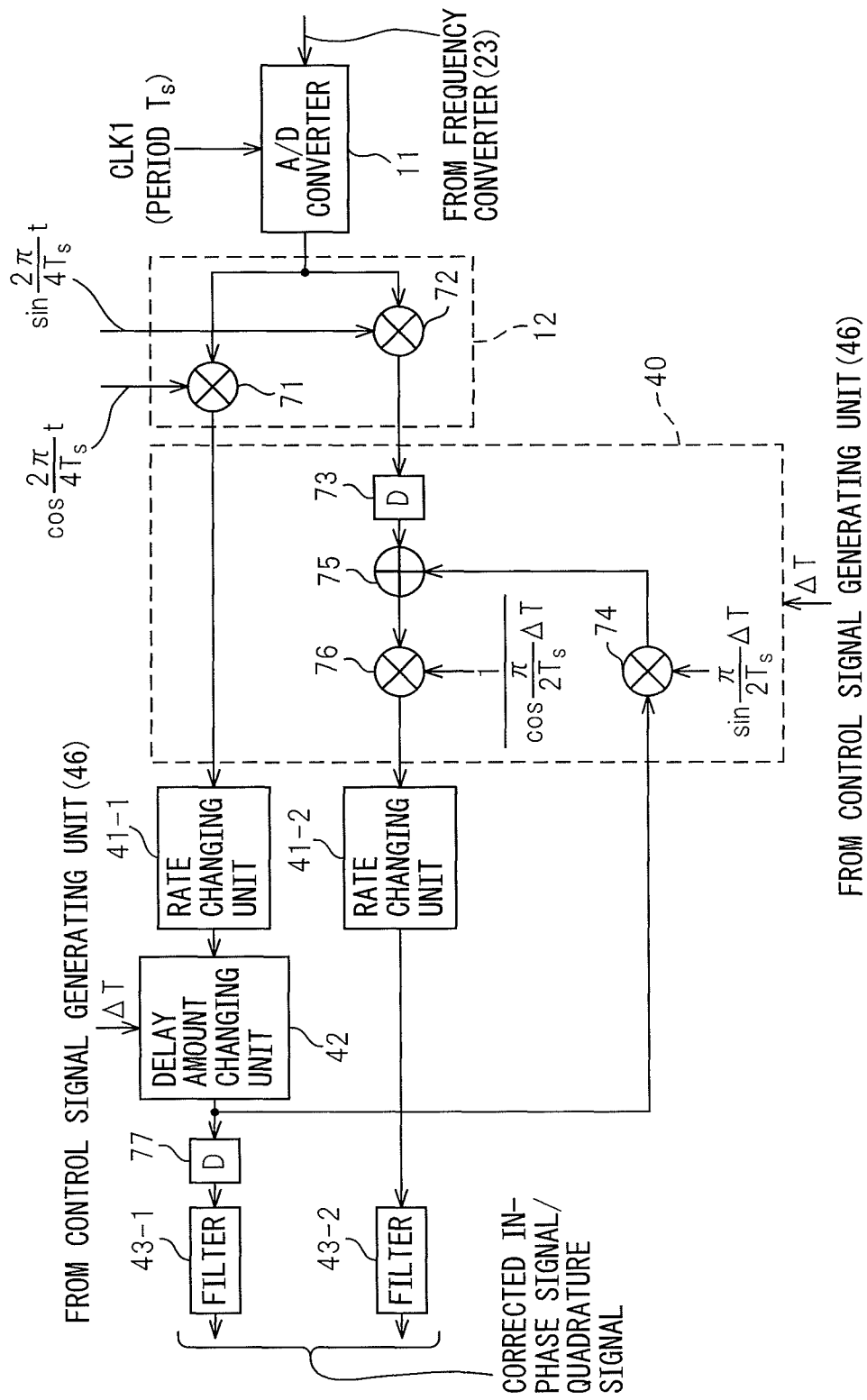
FIG. 12 is an explanatory diagram illustrating the operation of a quadrature error correcting unit and a delay amount changing unit.

FIG. 12 is an explanatory diagram illustrating the operation of the quadrature error correcting unit 40 and the delay amount changing unit 42. Component elements 73 and 77 are delay elements for compensating the processing delay of the delay amount changing unit 42. The delay amount changing unit 42 cancels out the error in the amount of delay of the quadrature signal relative to the in-phase signal, by adjusting the amount of delay of the in-phase signal in accordance with the delay error occurring in the quadrature signal component $Q((2n+1) \times Ts + \Delta T)$. The delay amount changing unit 42 may be implemented using a digital filter similar to the filter 43.

For example, the delay amount changing unit 42 advances the phase of the in-phase signal by $(Ts + \Delta T)$ and supplies the resulting in-phase signal $I((2n+1) \times Ts + \Delta T)$ to the filter 43-1. The phase of the in-phase signal thus becomes equal to the phase of the quadrature signal component $Q((2n+1) \times Ts + \Delta T)$ supplied to the filter 43-2.

The quadrature error correcting unit 40 includes multipliers 74 and 76, an adder 75, and the delay element 73. The multiplier 76 multiplies the quadrature signal by the reciprocal of one of the quadrature error terms, $\cos((\pi/2Ts) \times \Delta T)$, thereby reducing the error occurring in the quadrature signal. The multiplier 74 multiplies the in-phase signal $I((2n+1) \times Ts + \Delta T)$ output from the delay amount changing unit 42 by $\sin((\pi/2Ts) \times \Delta T)$, and outputs the result of the multiplication. The adder 75 adds the output of the multiplier 74 to the quadrature signal, thereby eliminating or reducing the other one of the quadrature error terms, i.e., $-I((2n+1) \times Ts + \Delta T)\sin(\pi/2Ts) \times \Delta T)$.

The adjustment parameter $\Delta T$ that determines the amount of delay to be adjusted in the delay amount changing unit 42 and the amount of correction to be applied in the quadrature error correcting unit 40 is supplied as a control signal from the control signal generating unit 46, as will be described later. The control signal generating unit 46 reduces the signal strength of the image component by adjusting the adjustment parameter $\Delta T$ in such a manner that the signal strength of the image component measured by the image component measuring unit 45 falls within a predetermined allowable range.

In the present example, the error occurring in the in-phase and quadrature signals due to the sample timing error $\Delta T$ has been corrected by the delay amount changing unit 42 adjusting the amount of delay of the in-phase signal and the quadrature error correcting unit 40 correcting the quadrature signal. In an alternative example, the error occurring in the in-phase and quadrature signals due to the sample timing error $\Delta T$ may be corrected by the delay amount changing unit 42 adjusting the amount of delay of the quadrature signal and the quadrature error correcting unit 40 correcting the in-phase signal.

Alternatively, the delay amount changing unit 42 may adjust the amount of delay of both the in-phase and quadrature signals, and the quadrature error correcting unit 40 may correct both the in-phase and quadrature signals.

Further, in the present example, both the delay error correction by the delay amount changing unit 42 and the quadrature error correction by the delay amount changing unit 42 and the quadrature error correcting unit 40 have been performed. In an alternative example, only the delay error correction or the quadrature error correction may be performed. By only correcting either the delay error or the quadrature error improvement in the quality of the in-phase and quadrature signals can be expected.

Figure 13:
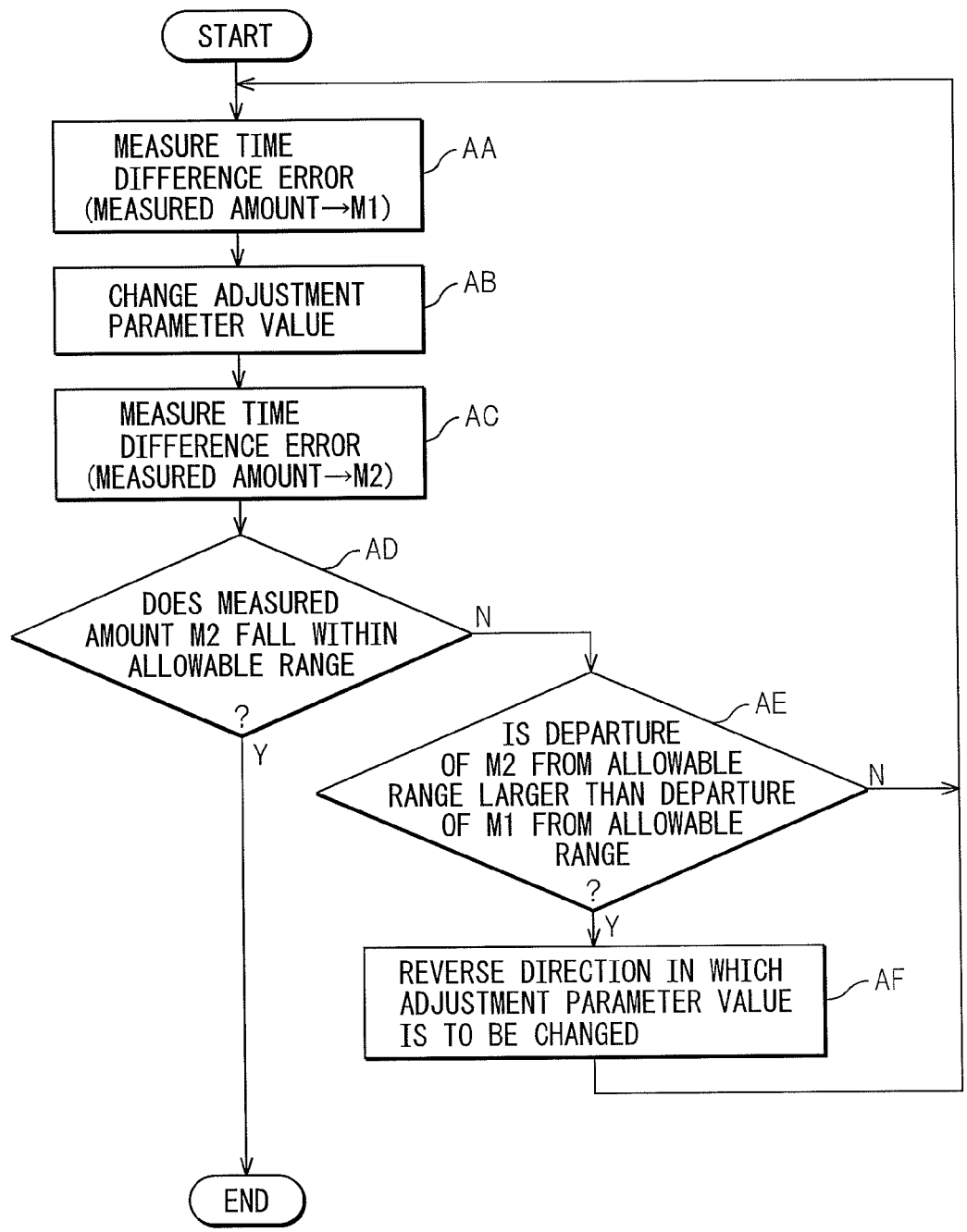
FIG. 13 is an explanatory diagram illustrating a process for reducing an error occurring in the in-phase and quadrature signals according to the embodiment.

FIG. 13 is an explanatory diagram illustrating the process for reducing the error occurring in the in-phase and quadrature signals according to the embodiment. In an alternative embodiment, the following operations AA to AF may be implemented as steps.

In operation AA, the frequency characteristic analyzing unit 44 and the image component measuring unit 45 measure the strength of the image component contained in at least either one of the in-phase and quadrature signals. By measuring the strength of the image component, the time difference error between the sample timings of the in-phase signal component and the quadrature signal component is measured. The measured amount taken in operation AA is designated M1.

In operation AB, the control signal generating unit 46 changes the value of the adjustment parameter $\Delta T$ to be supplied to the quadrature error correcting unit 40 and the delay amount changing unit 42. In operation AC, the frequency characteristic analyzing unit 44 and the image component measuring unit 45 measure the strength of the image component contained in at least either one of the in-phase and quadrature signals. The measured amount taken in operation AC is designated M2.

In operation AD, the control signal generating unit 46 determines whether or not the new measured amount M2 falls within the allowable range. If the new measured amount M2 falls within the allowable range (Y in operation AD), the control signal generating unit 46 terminates the adjustment of the adjustment parameter $\Delta T$, and supplies the adjusted adjustment parameter $\Delta T$ to the quadrature error correcting unit 40 and the delay amount changing unit 42.

If the new measured amount M2 falls outside the allowable range (N in operation AD), the control signal generating unit 46 proceeds to perform operation AE. In operation AE, the control signal generating unit 46 determines whether or not the amount of departure by which the new measured amount M2 departs from the allowable range is larger than the amount of departure by which the measured amount M1 departs from the allowable range.

If the amount of departure of the new measured amount M2 is larger than the amount of departure of the measured amount M1 (Y in operation AE), the control signal generating unit 46 proceeds to perform operation AF. In operation AF, the control signal generating unit 46 reverses the direction in which the adjustment parameter $\Delta T$ is to be changed in operation AB. After that, the process returns to operation AA. If the amount of departure of the new measured amount M2 is not larger than the amount of departure of the measured amount M1 (N in operation AE), the process returns to operation AA.

In the example of FIG. 13, the value of the adjustment parameter $\Delta T$ has been adjusted by the control signal generating unit 46 so that the measured amount by the frequency characteristic analyzing unit 44 and image component measuring unit 45 falls within the predetermined allowable range. Alternatively, the control signal generating unit 46 may adjust the adjustment parameter ΔT so that the measured amount by the frequency characteristic analyzing unit 44 and image component measuring unit 45 is minimized.

According to the above example, since the quality of the in-phase and quadrature signals used when generating the distortion compensating coefficient improves, the distortion compensating performance of the predistorter increases.

Figure 14:
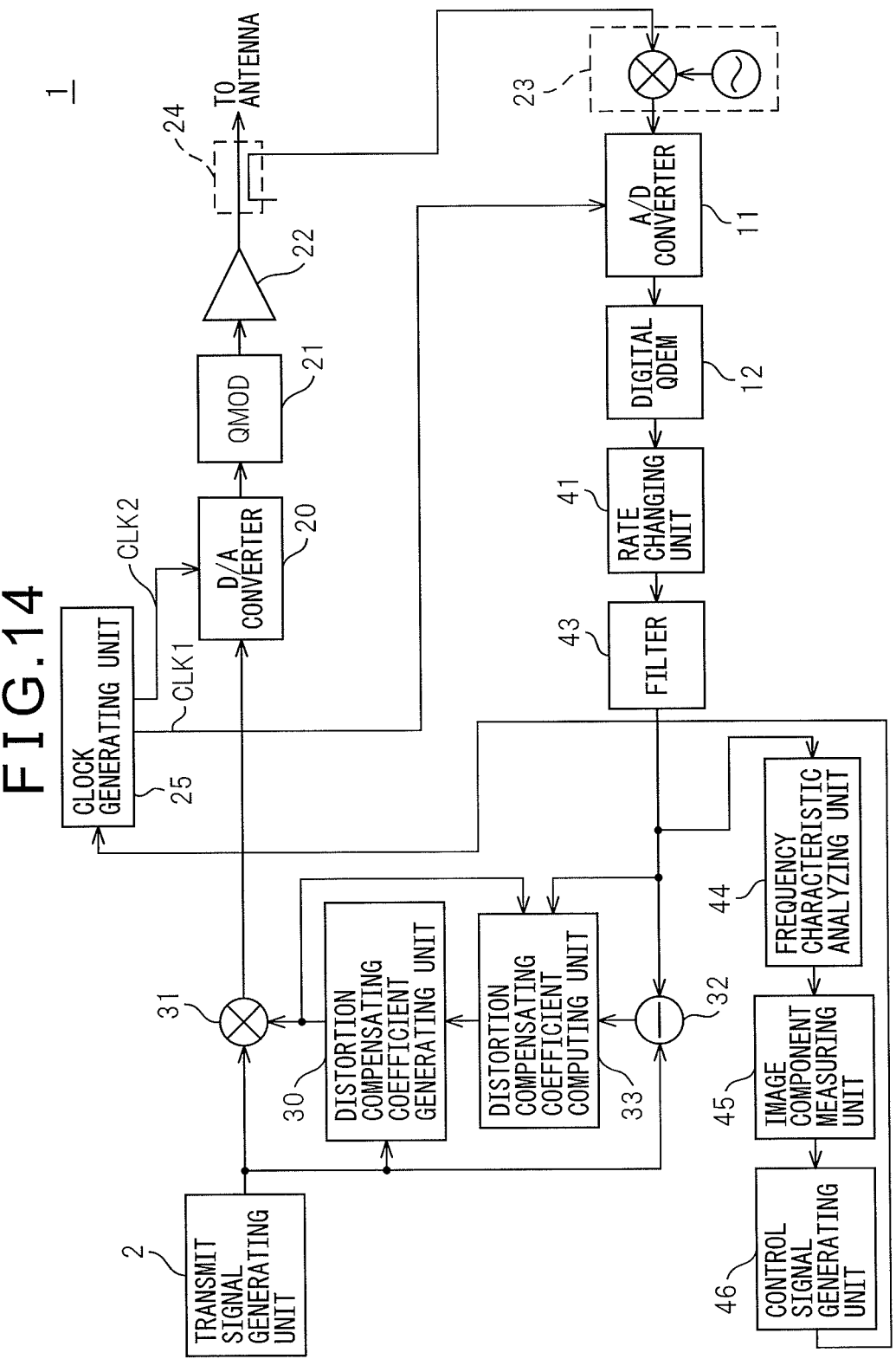
FIG. 14 is a simplified schematic diagram illustrating the configuration of a sixth example of the wireless apparatus according to the embodiment.

FIG. 14 is a simplified schematic diagram illustrating the configuration of a sixth example of the wireless apparatus according to the embodiment. The same component elements as those depicted in FIG. 7 are designated by the same reference numerals as those used in FIG. 7. In this example, the rate changing unit 41 changes the sampling frequency of the in-phase and quadrature signals from "f" to "f/2" by decimating by a factor of 2 the samples taken from the in-phase and quadrature signals output from the digital quadrature demodulation unit 12. Further, the filter 43 phase-synchronizes the in-phase and quadrature signals by adjusting the amount of delay by "1/f" in relative fashion between the in-phase and quadrature signals output from the rate changing unit 41.

In this example, the clock signal generating unit 25 adjusts the initial phase of at least either one of the clock signals CLK1 and CLK2 in accordance with the value of the adjustment parameter ΔT adjusted by the control signal generating unit 46.

Figure 15A:
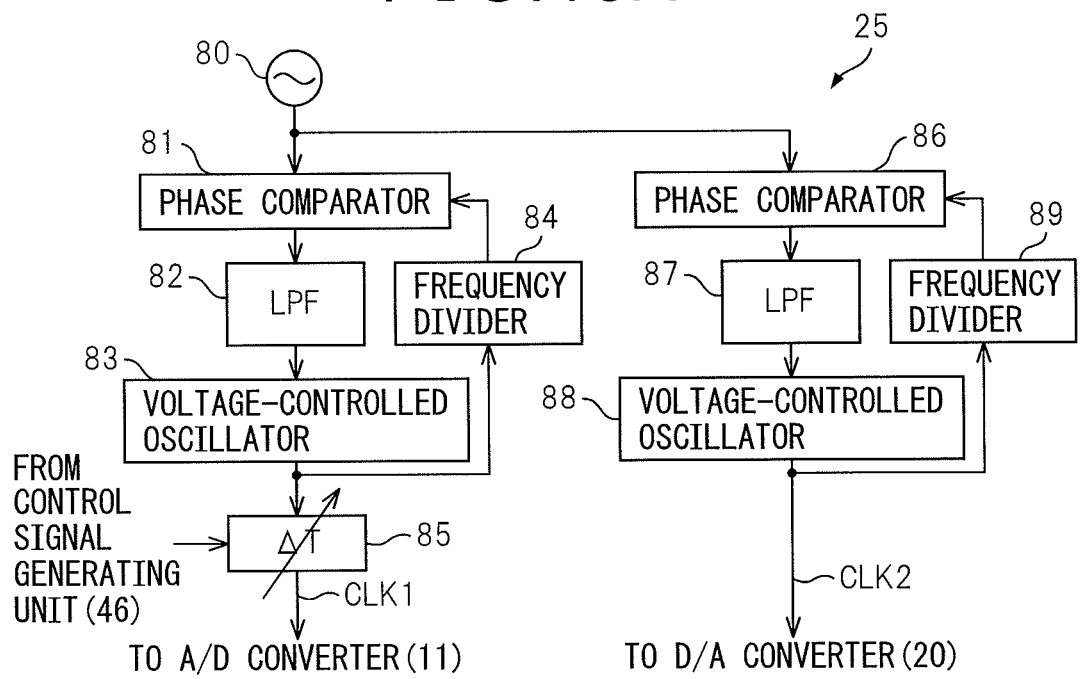
FIGS. 15A and 15B are diagrams illustrating configuration examples of a clock signal generating unit.
Figure 15B:
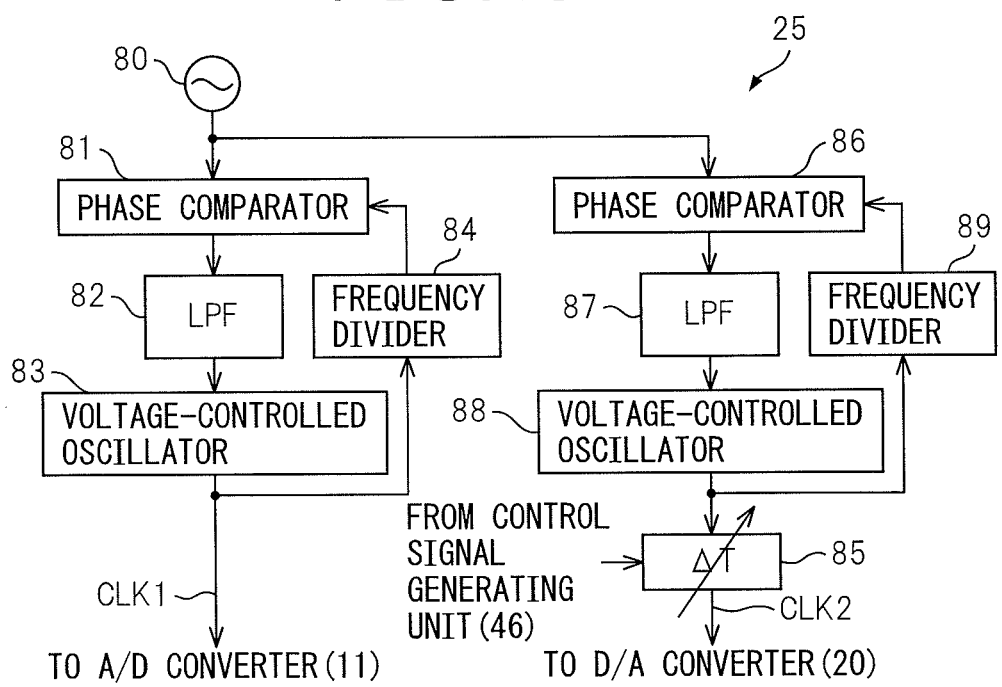

FIGS. 15A and 15B are diagrams illustrating configuration examples of the clock signal generating unit 25. The clock signal generating unit 25 includes an oscillator 80, phase comparators 81 and 86, low-pass filters (LPFs) 82 and 87, voltage-controlled oscillators 83 and 88, and frequency dividers 84 and 89.

The clock signal generating unit 25 generates the clock signal CLK1 by a first PLL circuit formed by the phase comparator 81, low-pass filter 82, voltage-controlled oscillator 83, and frequency divider 84. Further, the clock signal generating unit 25 generates the clock signal CLK2 by a second PLL circuit formed by the phase comparator 86, low-pass filter 87, voltage-controlled oscillator 88, and frequency divider 89.

The clock signal generating unit 25 of FIG. 15A is equipped with an initial phase adjusting unit 85 which adjusts the initial phase value of the clock signal CLK1. On the other hand, the clock signal generating unit 25 of FIG. 15B is equipped with an initial phase adjusting unit 85 which adjusts the initial phase value of the clock signal CLK2. The clock signal generating unit 25 may be configured to be able to adjust the initial phase values of both of the clock signals CLK1 and CLK2.

By adjusting the initial phase value of at least either one of the clock signals CLK1 and CLK2, the variation of sampling interval length, which occurs when CLK2 is superimposed on CLK1 due to crosstalk, is eliminated or reduced. Since this eliminates or reduces the time difference error between the sample timings of the in-phase signal component and the quadrature signal component, the quality of the in-phase and quadrature signals improves.

FIG. 16 is an explanatory diagram (part 2) illustrating the clock signal on which crosstalk noise is superimposed. As in FIG. 2, the waveform of the clock signal is simulated by a sine wave. Three waveforms are depicted representing the waveforms that occur when the initial phase value of the clock signal affected by the crosstalk is shifted in relative fashion. By changing the initial phase value of the clock signal, the relative positional relationship between the large-amplitude waveform portion and the small-amplitude waveform portion, i.e., the relative strength, is changed.

In the example of FIG. 16, the strength of the large-amplitude waveform portion of the clock signal indicated by a semi-dashed line is smaller than the strength of the large-amplitude waveform portion of the clock signal indicated by a solid line. On the other hand, the strength of the small-amplitude waveform portion of the clock signal indicated by the semi-dashed line is greater than the strength of the small-amplitude waveform portion of the clock signal indicated by the solid line. As a result, if it is assumed, for example, that the sample timing occurs when the signal value exceeds the threshold value illustrated here, the difference between the longer and shorter timing intervals is smaller for the sample timing provided by the clock signal indicated by the semi-dashed line than for the sample timing provided by the clock signal indicated by the solid line.

Figure 17:
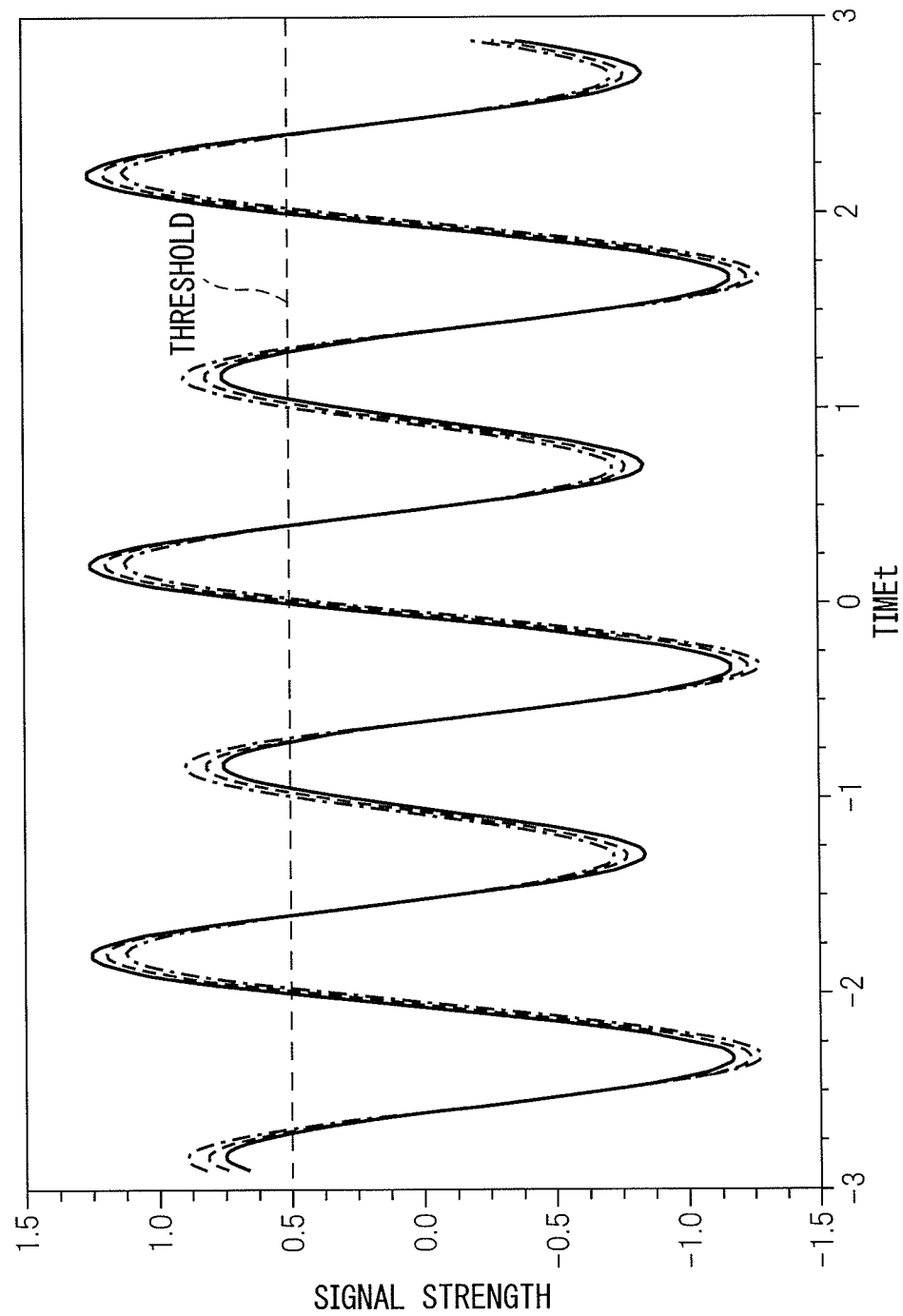
FIG. 17 is an explanatory diagram (part 3) illustrating the clock signal on which crosstalk noise is superimposed.

FIG. 17 is an explanatory diagram (part 3) illustrating the clock signal on which crosstalk noise is superimposed. As in FIG. 2, the waveform of the clock signal is simulated by a sine wave. Three waveforms are depicted representing the waveforms that occur when the initial phase value of the clock signal superimposed by the crosstalk is shifted in relative fashion. As in the case of FIG. 16, the difference between the longer and shorter timing intervals is smaller for the sample timing provided by the clock signal indicated by the semi-dashed line than for the sample timing provided by the clock signal indicated by the solid line.

Reference is made to FIG. 14. In much the same way that the adjustment parameter ΔT to be supplied to the quadrature error correcting unit 40 and the delay amount changing unit 42 is adjusted in the example of FIG. 7, the control signal generating unit 46 adjusts the adjustment parameter ΔT which is used to adjust the initial phase of at least either one of the clock signals CLK1 and CLK2. When the adjustment parameter ΔT is thus adjusted by the control signal generating unit 46, the time difference error between the sample timings of the in-phase signal component and the quadrature signal component is eliminated or reduced. Thus, the control signal generating unit 46 and the initial phase adjusting unit 85 are given as one example of the time difference error reducing unit 15.

In the example of FIG. 15B, the initial phase of the clock signal CLK2 is adjusted. If the crosstalk of the frequency component of f/2 into the clock signal CLK1 occurs due to the presence of some other clock signal, the initial phase of such other clock signal may be adjusted rather than that of the clock signal CLK2.

According to the above example, since the time difference error between the sample timings of the in-phase signal component and the quadrature signal component is reduced, the quality of the in-phase and quadrature signals can be enhanced.

Figure 18:
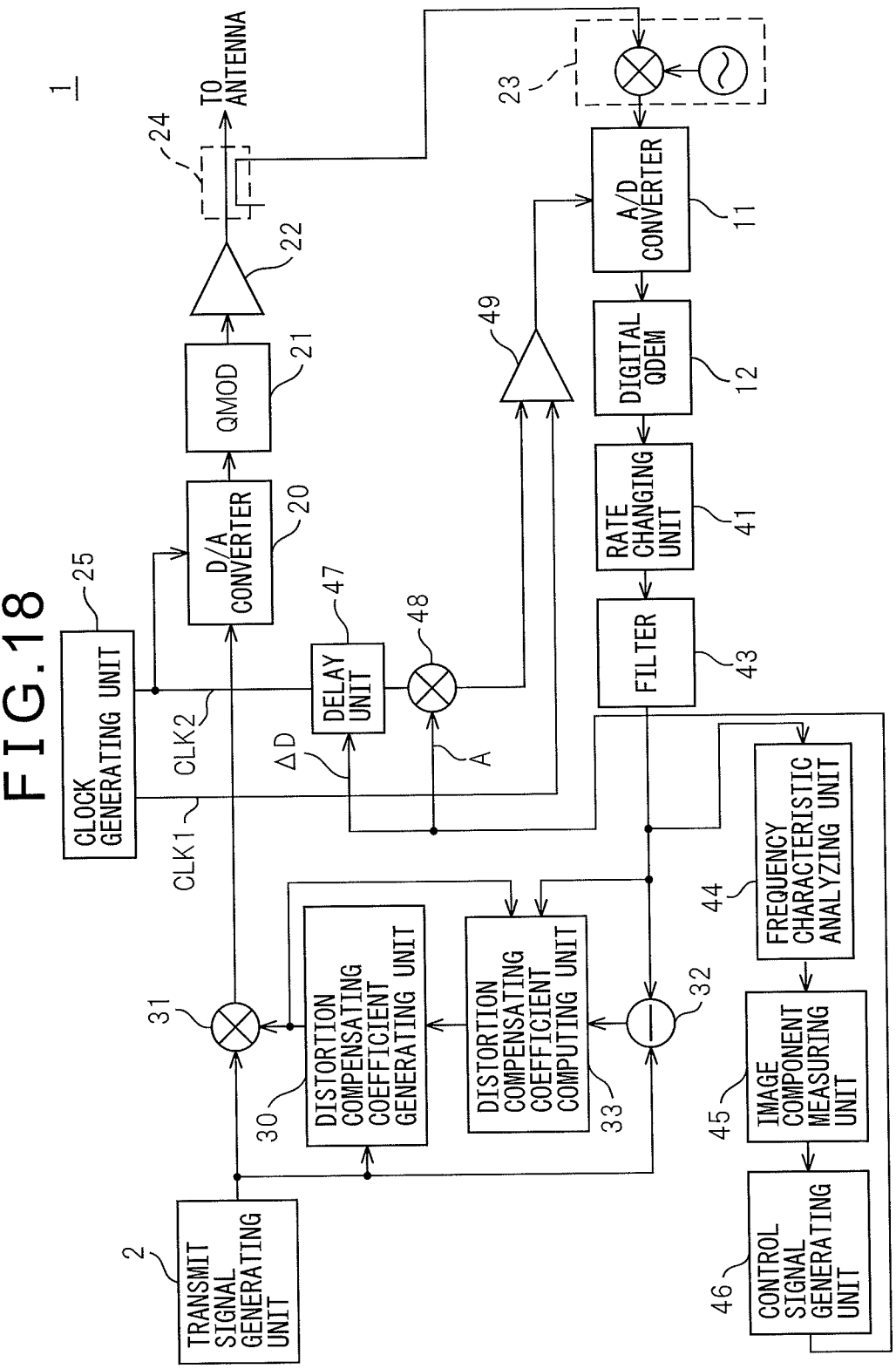
FIG. 18 is a simplified schematic diagram illustrating the configuration of a seventh example of the wireless apparatus according to the embodiment.

FIG. 18 is a simplified schematic diagram illustrating the configuration of a seventh example of the wireless apparatus according to the embodiment. The same component elements as those depicted in FIG. 14 are designated by the same reference numerals as those used in FIG. 14. Reference numeral 47 is a delay unit, 48 is a multiplier, and 49 is a differential amplifier. The wireless apparatus 1 thus includes the delay unit 47, multiplier 48, and differential amplifier 49.

The delay unit 47 delays the clock signal CLK2 by a delay amount ΔD which is supplied in terms of an adjustment parameter from the control signal generating unit 46. The multiplier 48 changes the level of CLK2 by multiplying the clock signal CLK2, delayed through the delay unit 47, by a coefficient A which is supplied in terms of an adjustment parameter from the control signal generating unit 46. The differential amplifier 49 subtracts from the clock signal CLK1 the clock signal CLK2 whose delay amount has been adjusted by the delay unit 47 and whose level has been adjusted by the multiplier 48, and supplies the resulting difference signal to the A/D converter 11. That is, the differential amplifier 49 adds a signal has opposite phase compared to the clock signal CLK2 to the clock signal CLK1.

According to the above example, since a signal has opposite phase compared to the clock signal CLK2 is added to the clock signal CLK1, the effects of crosstalk of the clock signal CLK2 can be reduced or eliminated from the clock signal CLK1 to be supplied to the A/D converter 11.

In much the same way that the adjustment parameter ΔT to be supplied to the quadrature error correcting unit 40 and the delay amount changing unit 42 is adjusted in the example of FIG. 7, the control signal generating unit 46 adjusts the delay amount ΔD and the coefficient A. If the crosstalk of the frequency component of f/2 into the clock signal CLK1 occurs due to the presence of some other clock signal, a signal has opposite phase compared to such other clock signal, rather than the clock signal CLK2, may be added to the clock signal CLK1.

Figure 19:
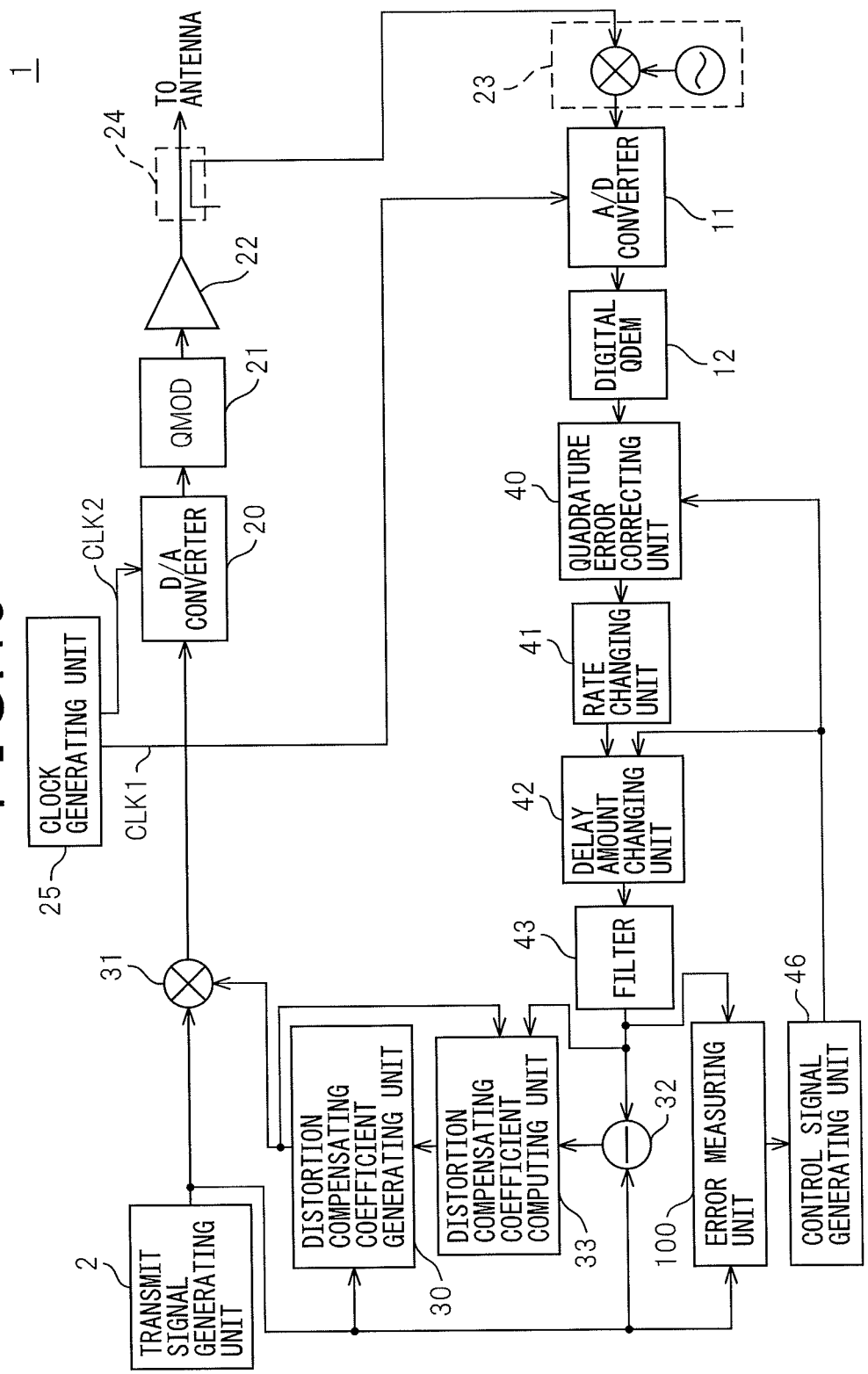
FIG. 19 is a simplified schematic diagram illustrating the configuration of an eighth example of the wireless apparatus according to the embodiment.

FIG. 19 is a simplified schematic diagram illustrating the configuration of an eighth example of the wireless apparatus according to the embodiment. The same component elements as those depicted in FIG. 7 are designated by the same reference numerals as those used in FIG. 7. The wireless apparatus 1 here includes an error measuring unit 100 which measures as an error the difference between the transmit signal and the in-phase and quadrature signals output as the feedback signal from the filter 43.

As previously described, an error occurs in at least either one of the in-phase and quadrature signals due to the time difference error between the sample timings of the in-phase signal component and the quadrature signal component in the A/D converter 11. Thus, the error measuring unit 100 is given as one example of the error detection unit 13.

The control signal generating unit 46 adjusts at least either the amount of change by which the amount of delay is to be changed by the delay amount changing unit 42 or the amount of correction to be applied by the quadrature error correcting unit 40, in such a manner that the error measured by the error measuring unit 100 either falls within a predetermined allowable range or is minimized. The amount of change by which the amount of delay is to be changed by the delay amount changing unit 42 and the amount of correction to be applied by the quadrature error correcting unit 40 may be adjusted by the control signal generating unit 46 in much the same way as the adjustment process performed based on the signal strength of the image component previously described with reference to FIG. 13.

In the present example also, since the quality of the in-phase and quadrature signals used when generating the distortion compensating coefficient improves, the distortion compensating performance of the predistorter increases.

Further, in the examples of FIGS. 14 and 18, the error detection by the error measuring unit 100 may be used instead of the error detection performed by the frequency characteristic analyzing unit 44 and the image component measuring unit 45.

Figure 20:
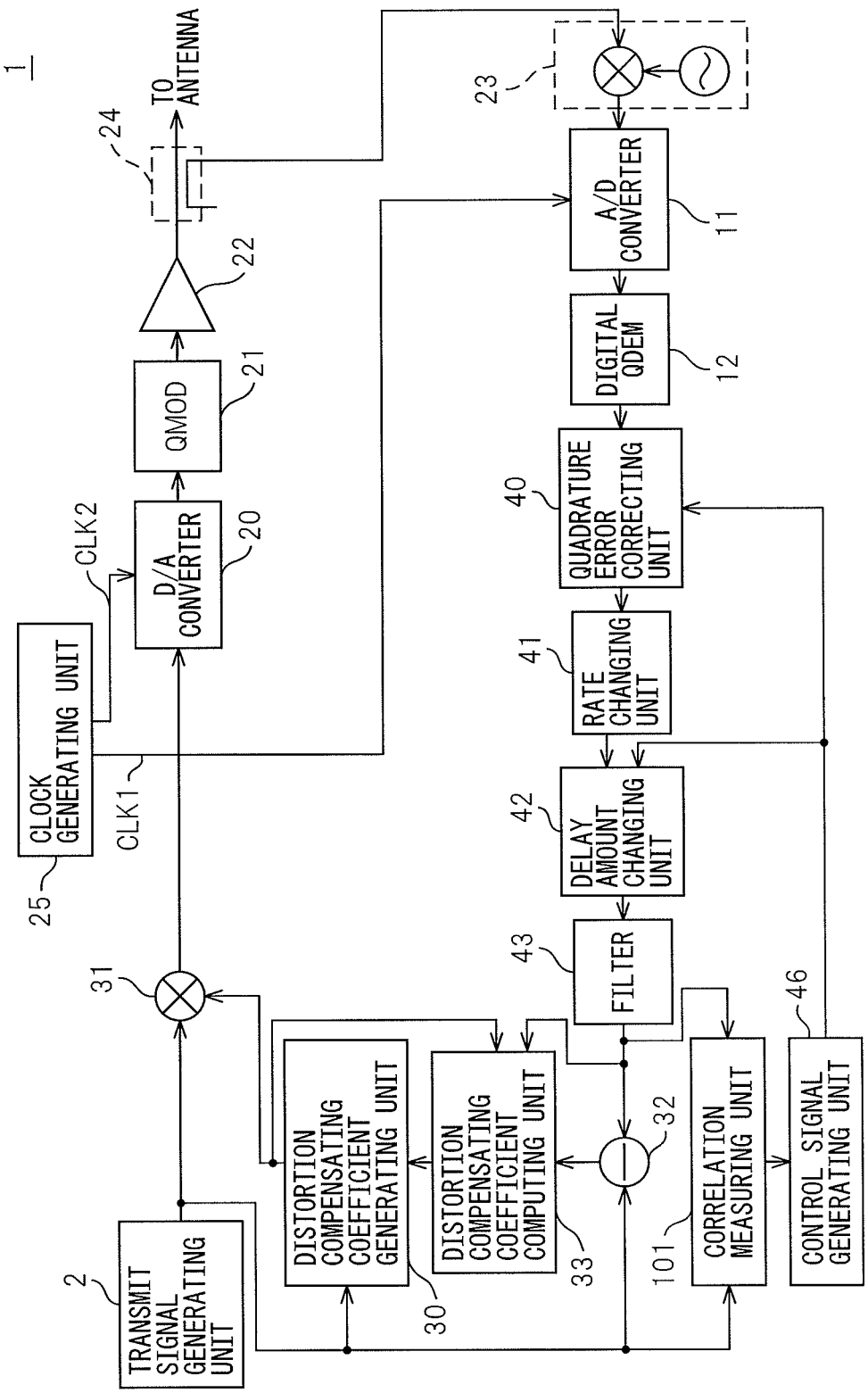
FIG. 20 is a simplified schematic diagram illustrating the configuration of a ninth example of the wireless apparatus according to the embodiment.

FIG. 20 is a simplified schematic diagram illustrating the configuration of a ninth example of the wireless apparatus according to the embodiment. The same component elements as those depicted in FIG. 7 are designated by the same reference numerals as those used in FIG. 7. The wireless apparatus 1 here includes a correlation measuring unit 101 which measures correlation between the transmit signal and the in-phase and quadrature signals output as the feedback signal from the filter 43.

As previously described, an error occurs in at least either one of the in-phase and quadrature signals due to the time difference error between the sample timings of the in-phase signal component and the quadrature signal component in the A/D converter 11. As a result, the value of the correlation between the transmit signal and the feedback signal varies according to the time difference error. Thus, the correlation measuring unit 101 is given as one example of the error detection unit 13.

The control signal generating unit 46 adjusts at least either the amount of change by which the amount of delay is to be changed by the delay amount changing unit 42 or the amount of correction to be applied by the quadrature error correcting unit 40, in such a manner that the correlation value measured by the correlation measuring unit 101 either falls within a predetermined allowable range or is maximized. The amount of change by which the amount of delay is to be changed by the delay amount changing unit 42 and the amount of correction to be applied by the quadrature error correcting unit 40 may be adjusted by the control signal generating unit 46 in much the same way as the adjustment process performed based on the signal strength of the image component previously described with reference to FIG. 13.

In the present example also, since the quality of the in-phase and quadrature signals used when generating the distortion compensating coefficient improves, the distortion compensating performance of the predistorter increases.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A wireless apparatus comprising: an analog-to-digital converter (A/D) which samples an in-phase signal component and a quadrature signal component from a quadrature-modulated signal of analog form alternately;
   a digital quadrature demodulation unit which applies digital quadrature demodulation to an output signal of said A/D converter and outputs an in-phase signal and a quadrature signal; and
   an error detection unit which, based on said in-phase and quadrature signals output from said digital quadrature demodulation unit, detects a time difference error between sample timing of said in-phase signal component and sample timing of said quadrature signal component and an amplifier which amplifies a modulated signal produced by quadrature-modulating a transmit signal;
   a distortion compensating coefficient computing unit which computes a distortion compensating coefficient so as to reduce a difference between said transmit signal as a reference signal and said in-phase and quadrature signals demodulated by said A/D converter and said digital quadrature demodulation unit from said modulated signal amplified by said amplifier; and a distortion compensating coefficient storage unit whose stored contents are updated by said computed distortion compensating coefficient; and a distortion compensating unit which applies distortion compensation to said transmit signal by using said distortion compensating coefficient.

2. The wireless apparatus as claimed in claim 1, further comprising an error reducing unit which, based on said time difference error detected by said error detection unit, reduces an error occurring in said in-phase and quadrature signals due to said time difference error.

3. The wireless apparatus as claimed in claim 2, wherein said error reducing unit includes a delay amount changing unit which changes the amount of delay of at least either one of said in-phase and quadrature signals.

4. The wireless apparatus as claimed in claim 2, wherein said error reducing unit includes a quadrature error correcting unit which corrects a quadrature error between said in-phase signal and said quadrature signal.

5. The wireless apparatus as claimed in claim 2, wherein said error reducing unit includes a time difference error reducing unit which reduces the time difference error between the sample timing of said in-phase signal component and the sample timing of said quadrature signal component.

6. The wireless apparatus as claimed in claim 5, further comprising a first clock generating unit which supplies a first clock signal of a first frequency to said A/D converter, and a second clock generating unit which supplies a second clock whose frequency is equal to one half of said first frequency, and wherein said time difference error reducing unit includes a phase adjusting unit which adjusts the phase of at least either said first clock signal that said first clock generating unit supplies or said second clock signal that said second clock generating unit supplies.

7. The wireless apparatus as claimed in claim 5, further comprising a first clock generating unit which supplies a first clock signal of a first frequency to said A/D converter, and a second clock generating unit which supplies a second clock whose frequency is equal to one half of said first frequency, and wherein said time difference error reducing unit includes a signal applying unit which adds a signal has opposite phase compared to said second clock signal to said first clock signal.

8. The wireless apparatus as claimed in claim 1, wherein said error detection unit includes a frequency characteristic analyzing unit which detects an unwanted wave component contained in said in-phase and quadrature signals output from said digital quadrature demodulation unit.

9. The wireless apparatus as claimed in claim 2, wherein said error detection unit detects an amount of error or an amount of correlation between said transmit signal and said in-phase and quadrature signals.

10. A signal processing method comprising: sampling by an analog-to-digital converter (A/D) an in-phase signal component and a quadrature signal component from a quadrature-modulated signal of analog form alternately;

applying digital quadrature demodulation to an output signal of said A/D converter, thereby demodulating said output signal into an in-phase signal and a quadrature signal; and detecting, based on said in-phase and quadrature signals, a time difference error between sample timing of said in-phase signal component and sample timing of said quadrature signal component and amplifying by an amplifier a modulated signal produced by quadrature-modulating a transmit signal; and computing a distortion compensating coefficient so as to reduce a difference between said transmit signal as a reference signal and said in-phase and quadrature signals demodulated by said A/D converter and said digital quadrature demodulation from said modulated signal amplified by said amplifier;

updating a distortion compensating coefficient stored in a storage unit by said computed distortion compensating coefficient; and applying distortion compensation to said transmit signal by using said distortion compensating coefficient.

11. The signal processing method as claimed in claim 10, further comprising reducing, based on said detected time difference error, an error occurring in said in-phase and quadrature signals due to said time difference error.

* * * * *